United States Patent [19]

Brodeur

[11] 4,325,067
[45] Apr. 13, 1982

[54] METHOD AND APPARATUS FOR REMOVING NOISE IN A LORAN-C NAVIGATION RECEIVER

[75] Inventor: Lester R. Brodeur, Nashua, N.H.

[73] Assignee: Sanders Associates, Inc., Nashua, N.H.

[21] Appl. No.: 28,142

[22] Filed: Apr. 9, 1979

Related U.S. Application Data

[62] Division of Ser. No. 937,615, Aug. 28, 1978.

[51] Int. Cl.³ ............................................. G01S 1/24
[52] U.S. Cl. ................................................. 343/103
[58] Field of Search ................................... 343/103

[56] References Cited

U.S. PATENT DOCUMENTS 3,870,999  3/1975  Mathews et al. .................. 343/103

Primary Examiner—Theodore M. Blum
Attorney, Agent, or Firm—Louis Etlinger; Ronald Reichman

[57] ABSTRACT

Noise generated in the front end of a LORAN-C receiver that causes noise bias interfering with carrier cycle detection is effectively removed by periodically shifting the phase of all received signals of 180° in the front end of the receiver and then removing any phase shift elsewhere in the receiver where noise is no longer a problem but before the phase shift can affect time difference of signal arrival measurements normally made in LORAN-C receivers. In this manner, noise generated in the front end of the receiver is averaged out and doesn't introduce bias levels to the received signal.

7 Claims, 16 Drawing Figures

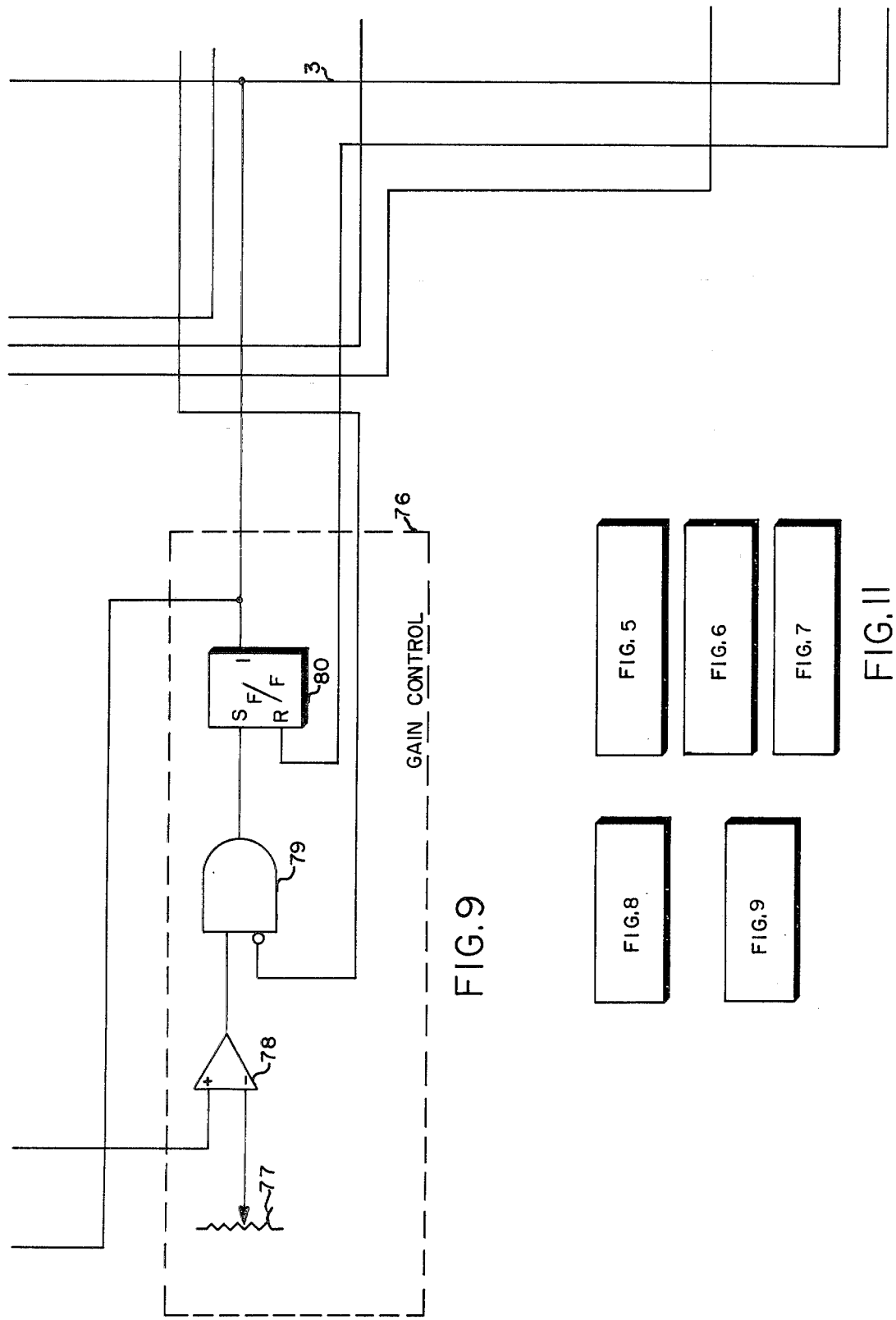

METHOD AND APPARATUS FOR REMOVING NOISE IN A LORAN-C NAVIGATION RECEIVER

This is a division of application Ser. No. 937,615, filed Aug. 28, 1978.

FIELD OF THE INVENTION

This invention relates to navigational equipment and more particularly to hypobolic navigational equipment utilizing the time difference in the propagation of radio frequency pulses from synchronized ground transmitting stations.

BACKGROUND OF THE INVENTION

Throughout maritime history navigators have sought an accurate reliable method of determining their position on the surface of the earth and many instruments such as the sextant were devised. During the second world war, a long range radio-navigation system, LO-RAN-A, was developed and was implemented under the auspices of the United States Coast Guard to fulfill wartime operational needs. At the end of the war there were seventy LORAN-A transmitting stations in existence and all commercial ships, having been equipped with LORAN-A receivers for wartime service, continued to use this navigational system. This navigational system served its purpose but shortcomings therein were overcome by a new navigational system called LORAN-C.

Presently, there are eight LORAN-C multi-station transmitting chains in operation by 1980. This new navigational system will result in an eventual phase-out of the earlier LORAN-A navigational system.

LORAN-C is a pulsed low-frequency (100 kilohertz), hyperbolic radio navigation system. LORAN-C radio navigation systems employ three or more synchronized ground stations that each transmit radio pulse chains having, at their respective start of transmissions, a fixed time relation to each other. The first station to transmit is referred to as the master station while the other stations are referred to as the secondary stations. The pulse chains are radiated to receiving equipment that is generally located on aircraft or ships whose position is to be accurately determined. The pulse chains transmitted by each of the master and secondary stations is a series of pulses, each pulse having an exact envelope shape, each pulse chain transmitted at a constant precise repetition rate, and each pulse separated in time from a subsequent pulse by a precise fixed time interval. In addition, the secondary station pulse chain transmissions are delayed a sufficient amount of time after the master station pulse train transmissions to assure that their time of arrival at receiving equipment anywhere within the operational area of the particular LORAN-C system will follow receipt of the pulse chain from the master station.

Since the series of pulses transmitted by the master and secondary stations is in the form of pulses of electromagnetic energy which are propagated at a constant velocity, the difference in time of arrival of pulses from a master and a secondary station represents the difference in the length of the transmission paths from these stations to the LORAN-C receiving equipment.

The focus of all points on a LORAN-C chart representing a constant difference in distance from a master and a secondary station, and indicated by a fixed time difference of arrival of their 100 kilohertz carrier pulse chains, described a hyperbola. The LORAN-C navigation system makes it possible for a navigator to exploit this hyperbolic relationship and precisely determine his position using a LORAN-C chart. By using a moderately low frequency such as 100 kilohertz, which is characterized by low attenuation, and by measuring the time difference between the reception of the signals from master and secondary stations, the modern-day LORAN-C system provides equipment position location accuracy within two hundred feet and with a repeatability of within fifty feet.

The theory and operation of the LORAN-C radio navigation system is described in greater detail in an article by W. P. Frantz, W. Dean, and R. L. Frank entitled "A Precision Multi-Purpose Radion Navigation System," 1957 I.R.E. Convention Record, Part 8, page 79. The theory and operation of the LORAN-C radio navigation system is also described in a pamphlet put out by the Department of Transportation, United States Coast Guard, Number CG-462, dated August, 1974, and entitled "LORAN-C User Handbook".

The LORAN-C system of the type described in the aforementioned article and pamphlet and employed at the present time, is a pulse type system, the energy of which is radiated by the master station and by each secondary station in the form of pulse trains which include a number of precisely shaped and timed bursts of radio frequency energy as priorly mentioned. All secondary stations each radiate pulse chains of eight discrete time-spaced pulses, and all master stations transmit the same eight discrete time-spaced pulses but also transmit and identifying ninth pulse which is accurately spaced from the first eight pulses. Each pulse of the pulse chains transmitted by the master and secondary stations has a 100 kilohertz carrier frequency, so that it may be distinguished from the much higher frequency carrier used in the predecessor LORAN-A system.

The discrete pulses radiated by each master and each secondary LORAN-C transmitter are characterized by an extremely precise spacing of 1,000 microseconds between adjacent pulses. Any given point on the precisely shaped envelope of each pulse is also separated by exactly 1,000 microseconds from the corresponding point on the envelope of a preceding or subsequent pulse within the eight pulse chains pulses. To insure such precise time accuracy, each master and secondary station transmitter is controlled by a cesium frequency standard clock and the clocks of master and secondary stations are synchronized with each other.

As mentioned previously, LORAN-C receiving equipment is utilized to measure the time difference of arrival of the series of pulses from a master station and the series of pulses from a selected secondary station, both stations being within a given LORAN-C chain. This time difference of arrival measurement is utilized with special maps having time difference of arrival hyperbola information printed thereon. These maps are standard LORAN-C hydrographic charts prepared by the U.S. Coast Guard and the hyperbola curves printed thereon for each secondary station are marked with time difference of arrival information. Thus, the difference in time arrival between series of pulses received from a master station and selected ones of the associated secondary stations must be accurately measured to enable the navigator to locate the hyperbola on the chart representing the time difference measured. By using the time difference of arrival information between a master station and two or more secondary stations, two or more corresponding hyperbolae can be located on the chart and their common point of intersection accurately identifies the position of the Loran-C receiver. It is clear that any inaccuracies in measuring time difference of arrival of signals from master and secondary transmitting stations results in position determination errors. This requires that oscillators internal to the Loran-C receiver be calibrated frequently in order to avoid measurement errors caused by oscillator inaccuracy.

There are other hyperbolic navigation systems in operation around the world similar to Loran-C, and with which my novel receiver can readily be adapted to operate by one skilled in the art. There is a Loran-D system utilized by the military forces of the United States, as well as the aforementioned Loran-A system. Others are DECCA, DELRAC, OMEGA, CYTAC, GEE and the French radio WEB, all of which operate in various portions of the radio frequency spectrum and provide varying degrees of positional accuracy.

Loran-C receiving equipment presently in use is relatively large in size, heavy, requires frequent calibration, and requires relatively large amounts of power. In addition, present Loran-C receivers are relatively expensive and, accordingly, are found only on larger ships and aircraft. Due to the cost size, weight, and power requirements of present Loran-C receiving equipment, such equipment is not in general use on small aircraft, fishing boats and pleasure boats. In addition, Loran-C receiving equipment presently in use required anywhere from five to ten minutes to warm up and provide time difference measurement information.

The signals presently received by Loran-C navigation receivers have very low signal to noise ratios and it is difficult to locate the third cycle positive zero crossing conventionally used in making the time difference measurements between signals received from the master and secondary stations. This problem is exacerbated by noise generated within the circuitry of LORAN-C navigation receivers and particularly in the front end circuitry in the signal path immediately following the receiver antenna.

Thus, there is a need in the art for improved circuitry and techniques to minimize the noise internally generated or to minimize the effect of noise generated internal to LORAN-C receivers. It is a feature of this invention to minimize the effects of noise generated internally to a receiver by averaging out the noise.

There is also a need in the art for inexpensive oscillators within LORAN-C receivers that never require calibration yet the operation of the receiver is as if the oscillators are as accurate as a laboratory standard oscillator. Such oscillators increase the accuracy and reliability of navigation information output from the receiver.

SUMMARY OF THE INVENTION

The foregoing needs of the prior art are satisfied by my novel Loran-C receiver. I eliminate much of the complex and costly automatic acquisition and tracking circuitry in prior art Loran-C navigation receivers and provide a small, light weight, inexpensive receiver using relatively little electrical power and requiring no calibration of the receiver oscillator/clock. In addition, I minimize noise generated internal to the LORAN-C receiver to increase accuracy and reliability of the navigation information output from the receiver.

Four thumbwheel switches on my Loran-C equipment are used by the operator to enter the group repetition interval information for a selected Loran-C chain covering the area within which the Loran-C equipment is being operated. This information entered via the thumbwheel switches is used in the process of locating the signals from the master and secondary stations of the chosen Loran-C chain and providing an output.

The receiver of my equipment receives all signals that appear within a small bandwidth centered upon the 100 KHz operating frequency of the Loran-C network. A shift register clocked at 100 KHz is coupled with logic circuitry continuously check all received signals to search for the unique pulse trains transmitted by Loran-C master and secondary stations. The microprocessor and other circuits internal to my noval Loran-C equipment analyze outputs from the register and associated logic circuitry indicating that signals from master or secondary stations have been received to first determine which received signals match the group repetition interval rate for the selected Loran-C chain. Once the receiver has identified the pulse trains from the selected master station and can predict future receipt of same, the microprocessor causes other circuitry to go into a fine search mode.

In the fine search mode the microprocessor enables a phase-lock-loop made up of a computer program and other circuitry including a cycle detector to analyze and locate the third cycle positive zero crossing point of each received master station pulse. In the event the third cycle positive zero crossing of each master station pulse is not located at the time calculated by the microprocessor, the cycle detector provides outputs used by the microprocessor to determine whether multiples of 10 microseconds should be added to or subtracted from the calculated time. The microprocessor then repeats the fine search mode analyzation process. This analyzation process and revising the calculated time is repeated using feedback from the cycle detector until the third cycle positive zero crossing of each pulse of the master station pulse train is located.

Once the third cycle positive zero crossing of each pulse from the master transmitting station of the selected Loran-C chain is located, the receiver operates to locate the associated secondary stations. The microprocessor creates a small number of time bins between the arrival of each pulse train from the master station and creates a coarse histogram by putting a count in an appropriate bin when a secondary station signal is detected. Once particular bins are found to contain counts representing receipt of signals from secondary stations, the microprocessor breaks those particular bins down into a large number of time bins creating a fine histogram to more closely determine the time of signal arrival of secondary station signals. The cycle detector is then utilized in conjunction with the microprocessor in a phase-lock-loop made to identify the third cycle positive zero crossing of each received pulse from a secondary station.

The microprocessor then makes accurate time difference of arrival measurements between the time of arrival of signals from the master station and the secondary stations. The equipment operator utilizes other thumbwheel switches to indicate secondary stations, the time difference of signal information which is to be visually displayed. The operator of the Loran-C equipment plots these visual read-outs on a Loran-C hydrographic chart to locate the physical position of the Loran-C receiver on the surface of the earth.

Our novel Loran-C navigation receiver need never have its internal oscillator calibrated unlike prior art receivers. The microprocessor, having the GRI input thereto by the receiver operator, thereby knows how many cycles of the internal oscillator must occur within the cesium clock standard GRI between two consecutive received master station pulse trains. Any error is noted and interpolated over the GRI period and correction factors are added or subtracted to internal circuit clock counts of interest to thereby achieve highly accurate time difference of signal arrival measurements.

The LORAN-C receiver circuitry keeps track of the receipt of master and secondary transmitter station signals each periodically transmitted at the Group Repetition Interval (GRI) and periodically causes the phase of the received signals to be inverted or shifted 180°. This is done at the front end of the receiver immediately after the antenna with preamplifier and 100 KHz input filter. It is the front end of receivers where troublesome internal noise is generated. These periodic phase reversals cause the internally generated noise to average out and thus it does not introduce a bias level to the received signals, which bias level causes erroneous time difference of signal arrival measurements to be made by the receiver. The periodic phase reversals are removed or compensated for further in the signal path through the receiver before the time period of the 180° phase shift interferes with the time difference of signal arrival measurements standardly made in LORAN-C receivers.

The Applicant's novel Loran-C navigation receiver will be better understood upon a review of the detailed description given hereinafter in conjunction with the drawing in which:

BRIEF DESCRIPTION OF THE DRAWINGS

FIGS. 5, 6, 7, 8 and 9 are detailed block diagrams of the Applicants' navigation receiver;

FIG. 11 shows the manner in which FIGS. 5, 6, 7, 8 and 9 should be arranged with respect to each other when reading the detailed description.

GENERAL DESCRIPTION

Figure 2:
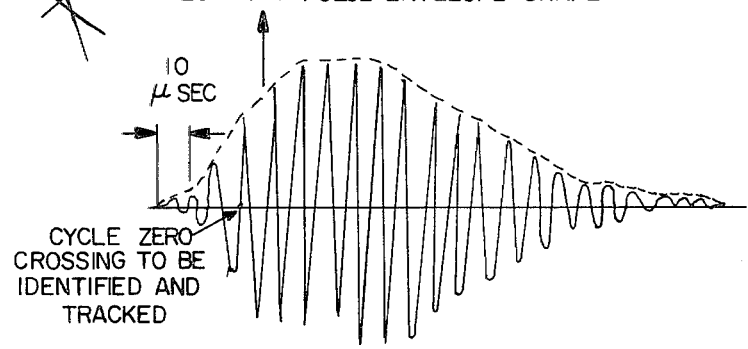
FIG. 2 shows the shape of each pulse of the pulse trains transmitted by all Loran-C master and secondary stations.

To understand the general or detailed operation of our novel Loran-C receiver, it is best to first understand the makeup of the signals transmitted by Loran-C stations and being received by our novel receiver. Representations of these signals are shown in FIGS. 2 and 3 which will now be discussed.

Figure 3:
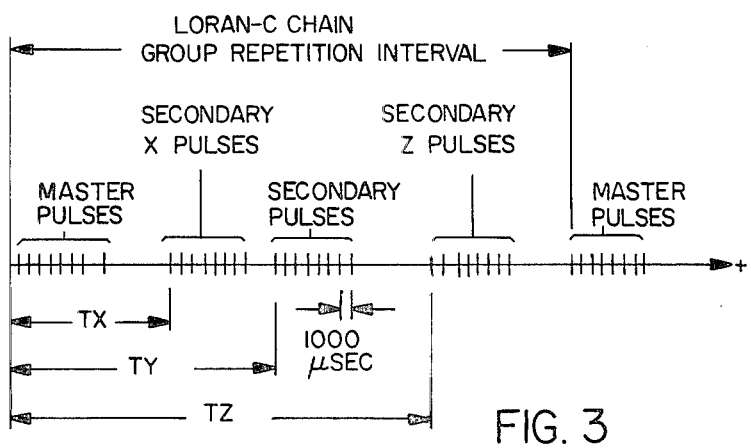
FIG. 3 is a graphical representation of the pulse trains transmitted by the master and secondary stations within a Loran-C chain.

All master and secondary stations transmit groups of pulses as briefly mentioned above, at a specified group repetition interval which is defined as shown in FIG. 3. Each pulse has a 100 KHz carrier and is of a carefully selected shape shown in FIG. 2. For each Loran-C chain a group repetition interval (GRI) is selected of sufficient length so that it contains time for transmission of the pulse chains from the master station and each associated secondary station, plus time between the transmission of each pulse train from the master station so that signals received from two or more stations within the chain will never overlap each other when received anywhere in the Loran-C chain coverage area. Each station transmits one pulse chain of eight or nine pulses per GRI as shown in FIG. 3. The master station pulse chain consists of eight pulses, each shaped like the pulse shown in FIG. 2, with each of the eight pulses spaced exactly 1,000 microseconds apart, and with a ninth pulse spaced exactly 2,000 microseconds after the eighth pulse. The pulse chain for each of the secondary stations X, Y and Z contains eight pulses shaped as shown in FIG. 2, and each of the eight pulses is also spaced exactly 1,000 microseconds apart. The pictorial representation of the pulses transmitted by the master station and the three secondary stations X, Y and Z associated therewith shown in FIG. 3 shows that the pulse trains never overlap each other and all are received within the group repetition interval. FIG. 3 also shows a representative time difference of arrival of the pulse train from each of the secondary stations with respect to the master station. These time difference of arrival figures are designated Tx, Ty and Tz and are the time differences measured using my receiver.

It is to be recognized that the time difference of arrival between reception of the pulse train from the master station and the pulse trains from each of the X, Y and Z secondary stations will vary depending upon the location of the LORAN-C receiving equipment with the coverage area for a LORAN-C chain. In addition, the signal strength of the received signals from the master and secondary stations will also vary depending upon the location of the receiving equipment, as represented by the different heights of the representative pulse lines shown in FIG. 3.

The delayed or spaced ninth pulse of each master station not only identifies the pulse train as being from a master station, but the ninth pulse is also turned on and off by the Coast Guard in a "blink" code, well known in the art, to indicate particular faulty secondary stations in a LORAN-C chain. These "blink" codes are published by the Coast Guardon the LORAN-C charts.

In World War II when the LORAN-C systems were installed, carrier phase coding was used as a military security method, but after the war when the need for military security ceased, the phase coding was called a skywave unscrambling aid. In skywave unscrambling the 100 Khz. carrier pulses from the master station and the secondary stations in a LORAN-C chain are changed in phase to correct for skywave interference in a manner well-known in the art. Skywaves are echoes of the transmitted pulses which are reflected back to earth from the ionosphere. Such skywaves may arrive at the LORAN-C receiver anywhere between 35 microseconds to 1,000 microseconds after the ground wave for the pulses is received. In the 35 microsecond case, the skywave will overlap its own groundwave while in the 1,000 microsecond case the skywave will overlap the groundwave of the succeeding pulse. In either case the received skywave signal has distortion in the form of fading and pulse shape changes, both of which can cause positional errors. In addition, a skywave may be received at higher levels than a ground wave. To prevent the long delay skywaves from affecting time difference measurements, the phase of the 100 Khz. carrier is changed for selected pulses of a pulse train in accordance with a predetermined pattern. These phase code patterns are published by the Coast Guard on the LORAN-C charts.

The exact pulse envelope shape of each of the pulses transmited by all master and secondary stations is also very carefully selected to aid in measuring the exact time difference in arrival between a pulse train from a master station and a pulse train from a secondary station as is known to those skilled in the art. To make exact time difference measurement, one method the prior art teaches is superpositions matching pulse envelopes of pulses from a master station and a selected secondary station. Another method which we also utilize, is detection of a specific zero-crossing of the 100 KHz carrier of the master and secondary station pulses.

Now that the reader has an understanding of the nature of the signals transmitted by the Loran-C master and secondary stations and how they are used for navigation purposes, the reader can better understand the operation of our novel Loran-C receiver which will now be described.

Figure 1:
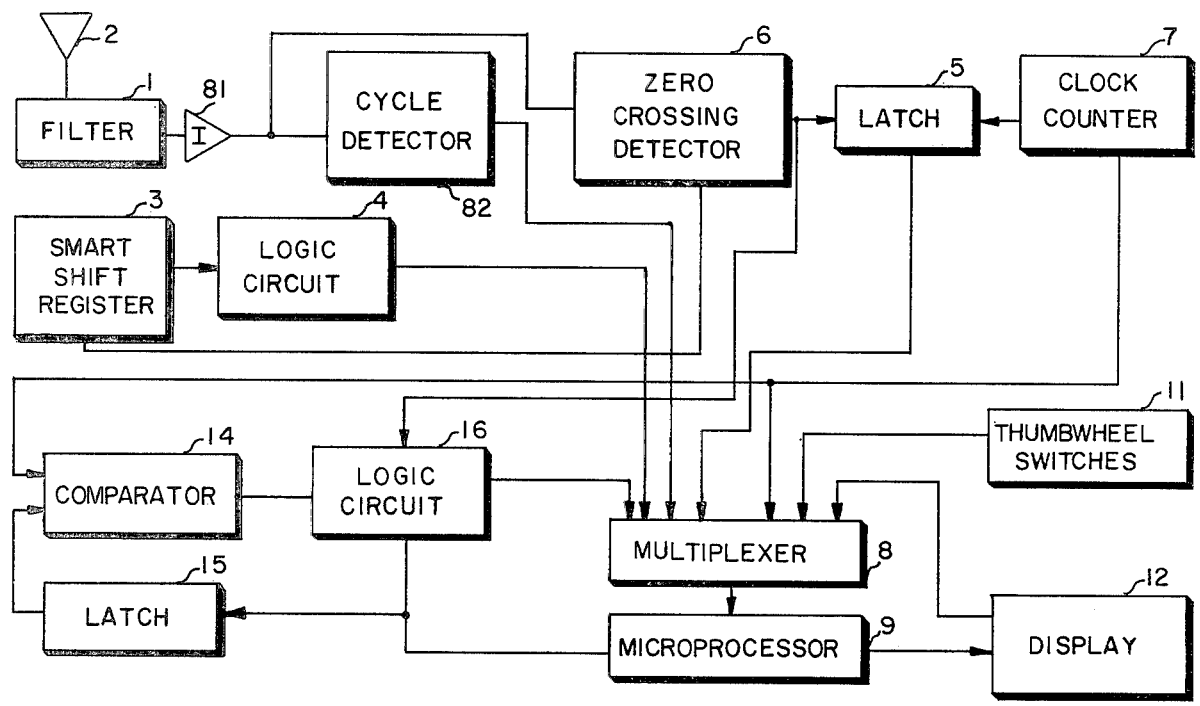
FIG. 1 is a general block diagram of the Applicant's Loran-C navigation receiver.

In FIG. 1 is seen a general block diagram of our novel Loran-C navigation equipment. Filter and preamplier 1 and antenna 2 are of a conventional design of the type used in all Loran-C receivers and is permanently tuned to a center frequency of 100 KHz, which is the operating frequency of all Loran-C transmitting stations. Filter 1 has a bandpass of 20 Kilohertz. Received signals are applied via inverting amplifier 81 to cycle detector 82 and to zero crossing detector 6.

The signal input to zero crossing detector 6 is first amplitude limited so that each cycle of each pulse is represented by a binary one and each negative half cycle is represented by a binary zero. The leading or positive edge of each binary one exactly corresponds to the positive slope of each sine wave comprising each pulse. Thus, detector 6 is a positive zero-crossing detector. As will be described in detail further in this specification logic circuit 16 also provides an input to zero crossing detector 6, not shown in FIG. 1, which sets a 10 microsecond window only within which the leading edge of each binary 1 may be detected. The end result is that only the positive zero-crossing of the third cycle of each pulse of the train pulse trains transmitted by each Loran-C station is detected and an output provided by detector 6.

It can be seen that latch 5 has its input from zero crossing detector 6. Clock/counter 7 is a crystal controlled clock which is running continuously while my novel Loran-C receiver is in operation. The count present in counter 7 at the moment that zero crossing detector 6 indicates a third cycle positive zero crossing is stored in latch 5, the contents of which are then applied to multiplexer 8. Multiplexer 8 is a time division multiplexer used to multiplex the many leads from logic circuit 16, logic circuit 4, cycle detector 82, latch 5, clock/counter 7, and thumbwheel switches 11 and 12, through to microprocessor 9. The count in latch 5 indicates to microprocessor 9 the time at which each positive zero crossing is detected.

The signal input to smart shift register 3 from detector 6 is a pulse train of 1's and 0's which is shifted through the shift register digital delay line which is tapped at 1 millisecond intervals. Because of the logic circuits connected to each tap thereof, only the pulse trains from Loran-C master and secondary stations will result in outputs from the logic circuits of register 3.

The logic circuits within register 3 are used to analyze the contents of the shift register delay line to first determine if the signals represent a pulse train from a Loran-C master or secondary station, and secondly to indicate the particular phase coding of the signals being received. Logic circuit 4 stores information from register 3 indicating whether a pulse train is from a master or a secondary station and further indicating the particular phase code transmitted. This information stored within logic circuit 4 is applied to microprocessor 9 via multiplexer 8 for use in processing received Loran-C signals. At the same time that information is stored within logic circuit 4, detector 6 causes latch 5 to store the present count in clock/counter 7 which indicates the time of occurrence. It should be noted that clock/counter 7 also has an input to multiplexer 8 so that microprocessor 9 can keep track of continuous running time as indicated by recycles of counter 7.

Thumbwheel switches 11 are used to input the GRI of a selected Loran-C chain to the receiver. The output of thumbwheel switches 11 are also input to multiplexer 8 to apply the GRI of the selected Loran-C chain to microprocessor 9.

With the various types of information being input to microprocessor 9 via multiplexer 8 from the circuits previously described, microprocessor 9 determines when received signals are from the master and secondary stations of the selected Loran-C chain. Once microprocessor 9 closely locates the signals from the selected master station, as determined by a match of the GRI number input thereto via thumbwheel switches 11 with the difference in time of receiving each pulse train transmitted by the master station of the selected chain, the receiver goes into a fine search mode utilizing a phase-lock-loop implemented with a computer program in microprocessor 9 and the loop being closed by an input from cycle detector 82 to locate the desired radio frequency carried third cycle positive zero crossing in conjunction with zero crossing detector 6. The receiver then switches to locate the secondary station signals of the selected chain. To locate the secondary stations microprocessor 9 creates first a coarse histogram and then a fine histogram by storing the time of receiving all secondary station signals in time slot bins created by the microprocessor in its own memory between the arrival of any two consecutive master station pulse trains. When signals from the secondary stations of the selected Loran-C chain are located by secondary station signal counts appearing in the coarse histogram time slot bins at the same rate as the GRI of the selected Loran-C chain, the microprocessor 9 creates a fine histogram having time slot bins of shorter time duration. In this manner, microprocessor 9 closely determines the time of arrival of pulse trains from the secondary stations of the selected Loran-C chain.

Once microprocessor 9 closely determines the time of receiving secondary station signals and can calculate the time of receipt of subsequently received secondary station pulse trains, the microprocessor causes the receiver to go into a fine search mode utilizing the same phase-locked-loop arrangement generally described above to accurately locate the third cycle positive zero crossing of each pulse of the secondary station pulse trains.

Again, control circuit 76 is provided to monitor the level of the received radio frequency signal and automatically adjust the gain of inverting amplifier 81. Circuits 31 and 32 within logic circuit 16 also control my novel inverting operation of amplifier 81 to periodically switch the phase of signals applied via amplifier 81 to the remainder of the receiver circuitry to average out the noise and thereby effectively remove the effects of noise internally generated in the front end of the receiver. These phase inversions are removed by exclusive OR gate 36 within zero crossing detector 6 whereat internally generated noise is not a significant problem and before the phase inversions introduce problems in the time difference of signal arrival measurements providing navigation information.

Once microprocessor 9 functioning with the other circuits in our Loran-C receiver has located and locked onto the pulse trains being transmitted by the master and secondary stations of the selected Loran-C chain, it makes the desired time difference of arrival measurements that are required in Loran-C operation. Microprocessor 9 then causes a visual indication to be given via display 12. The output information is platted on a Loran-C hydrographic chart in a well-known manner to locate the physical position of the Loran-C receiver.

There are lamps 70 through 75 on the front panel of the receiver which initially all flash on and off when the receiver is first turned on. As the signals of the master and each secondary station of the selected Loran-C chain are located and it is determined by microprocessor 9 that each station's signals can be utilized to make accurate time difference of signal arrival measurements, the lamp associated with that station is changed to be lit steady. This gives an indication to the receiver operator of the confidence he may have in selecting stations with switches 11 to make time difference of signal arrival measurements.

The oscillator internal to our Loran-C receiver never needs calibration, unlike prior art receivers. Microprocessor 9 knows exactly the time difference of signal arrival of the pulse trains from the master station of the selected chain because of the GRI input thereto via switches 11. This information is compared with the output of a master oscillator within the receiver to determine the frequency error of the oscillator. Microprocessor 9 then interpolates the error over the time period between receipt of signals from the master station and a correction factor is added or subtracted to internal clock indications of time of receipt of all pulses from the master and secondary stations to thereafter make accurate time difference of signal arrival measurements.

DETAILED DESCRIPTION

Turning now to describe in detail the operation of our novel Loran-C equipment.

In FIG. 2 is seen the shape of waveform of every pulse transmitted by both master and secondary Loran-C stations. The waveform of this pulse is very carefully chosen to aid in the detection of the third carrier cycle zero crossing in a manner well known in the art. One method known in the art is to take the first derivative of the curve represented by the envelope of the pulse shown in FIG. 2, and this first derivative clearly indicates a point at 25 microseconds from the beginning of the pulse. The next zero crossing following this indication is the desired zero crossing of the third cycle of the carrier frequency. Similar to the prior art method just described, our novel Loran-C receiver detects the third zero crossing for each pulse of the master station and each secondary station. The precise time difference of arrival measurements to be made utilizing a Loran-C receiver are made by measuring from the third cycle zero crossing of the fifth pulse of the master station pulse train and the third carrier cycle zero crossing of the fifth pulse of the manually selected secondary station.

In FIG. 3 is shown a representation of the nine pulse and eight pulse signals transmitted by a master station and the secondary stations of a Loran-C chain. The small vertical lines each represent a pulse waveform such as shown in FIG. 2. The height of the vertical lines represents the relative signal strength of the pulses as received at a Loran-C receiver. It can be seen that the signal strength of the pulses from the master station and each of the secondary stations are not identical.

It can be seen in FIG. 3 that the group repetition interval (GRI) is defined as the period between the first pulses of two consecutive master station pulse trains for a given LORAN-C chain. This information is found on standard LORAN-C hydrographic charts and is used to calibrate the oscillator in my novel LORAN-C receiver as will be described in greater detail further in this specification.

In a manner well known in the art, LORAN-C receiving equipment is used to measure the time difference of arrival between the pulse train from a master station pulse train and the pulse trains from two or more secondary stations associated with the master station. This time difference of arrival information is shown on FIG. 3 as $T_x$, $T_y$, and $T_z$.

Figure 4:
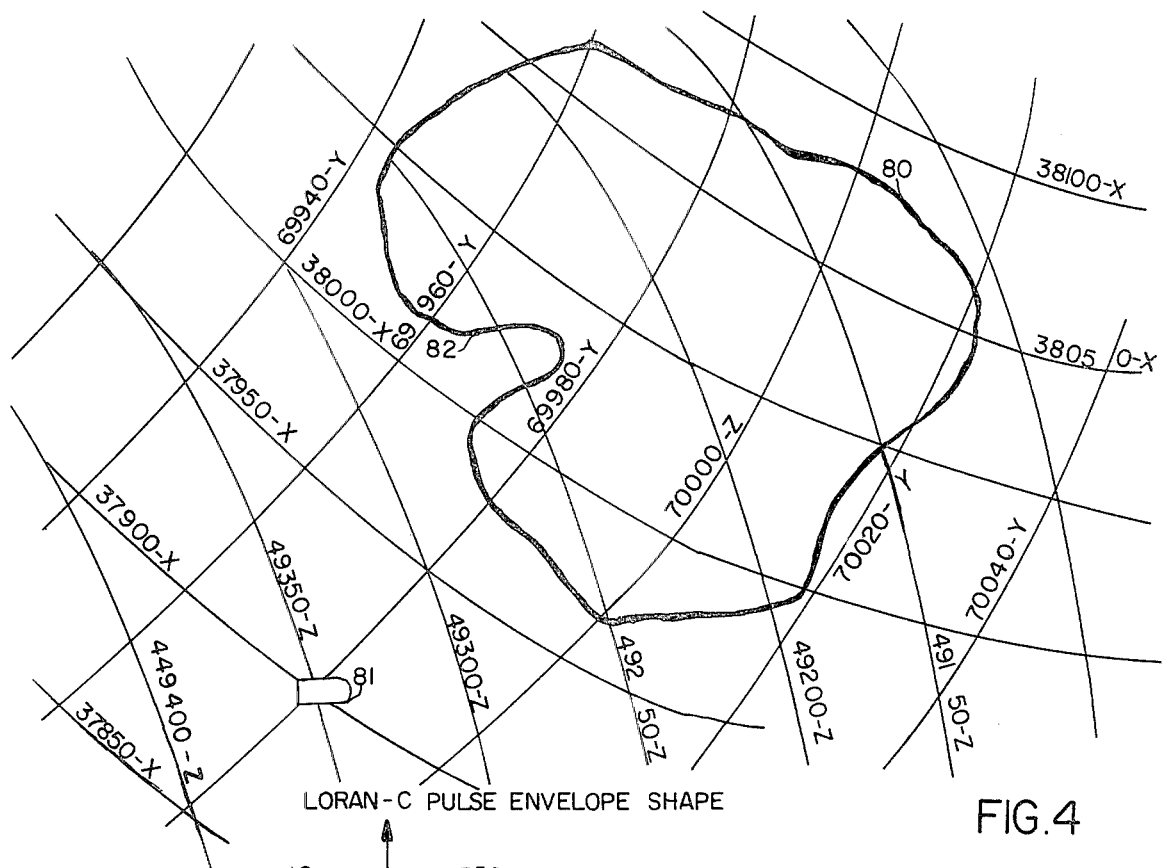
FIG. 4 is a representation of a portion of a Loran-C navigation chart.

In FIG. 4 is shown a representative figure of a LORAN-C hydrographic chart. On this chart are shown three sets of arcuate curves, each set of curves having a five digit number thereon and suffixed by one of the letters, x, y or z. The numbers directly correspond to the time difference of arrival information $T_x$, $T_y$ and $T_z$ shown in FIG. 3 and measured by a LORAN-C receiver. In FIG. 3 the particular secondary station with which a set of the arcuate curves is associated is indicated by the suffix x, y, or z after the numbers on the curves.

LORAN-C charts show land masses such as island 80 on FIG. 4. For an example, the operator of my LORAN-C receiver located on boat 81 near island 80 would measure the time difference of arrival information between the master station and at least two of the three secondary stations in the LORAN-C chain. The operator, in making a measurement with respect to the X secondary station would measure 379000 on my LORAN-C receiver. As can be seen in FIG. 4, the line of position (LOP) 379000 is shown passing through boat 81. In a similar manner, the operator would measure the time difference arrival information with respect to the Y secondary station and would come up with the number 699800 on the receiver. Again, the LOP for this receiver reading passes through boat 81. If the operator of the LORAN-C receiver measures the time difference of arrival information with respect to the Z secondary station the reading would show 493500 and the LOP for this reading also passes through boat 81. Thus, the operator can accurately fix the position of boat 81 on the LORAN-C chart. From this position information on the map of FIG. 4, boat 81 may, for example, be accurately navigated toward harbor 82 of island 80.

It will be noted that the sample LORAN-C chart shown in FIG. 4 has only five digits on each LOP, but my LORAN-C receivers, has six digits. The lowest order or sixth digit is used to interpolate between two LOPs on the LORAN-C chart in a manner well know in the art. In the simple example given above, boat 81 is located exactly on three LOPs so no interpolation need be done to locate a LOP between those shown on the chart of FIG. 4. Thus, it should be noted that the six digit numbers obtained utilizing my equipment each included an extra zero suffixed to the end of the five digit LOP numbers shown on the LORAN-C chart. A sixth digit other than zero on the receiver would require interpolation between the LOP lines on the chart.

In FIGS. 5, 6, 7, 8 and 9 is shown a detailed block diagram schematic of our novel LORAN-C receiver which will now be described in detail. FIGS. 5, 6, 7, 8 and 9 should be arranged as shown in FIG. 11 to best understand the description found hereinafter.

Loran-C signals are received via antenna 2 and preamplifier 1 in a manner well known in the art. Interference caused by miscellaneous radio frequency signals and signals from other navigational systems are essentially eliminated by filter 1 which utilizes filters having a 20 KHz bandwidth centered on 100 KHz with a sharp drop-off at either side of this band. Filter 1 is of a conventional design and is not described in further detail herein. Similarly, the choice of antenna 2 and/or the design thereof is also well known in the art and is not disclosed herein in detail for the purpose of not cluttering up the specification with details that are well known in the art and would detract from an understanding of the invention. The output from filter 1 is the undemodulated 100 KHz radio frequency signal and is applied to inverting amplifier 81.

Figure 10:
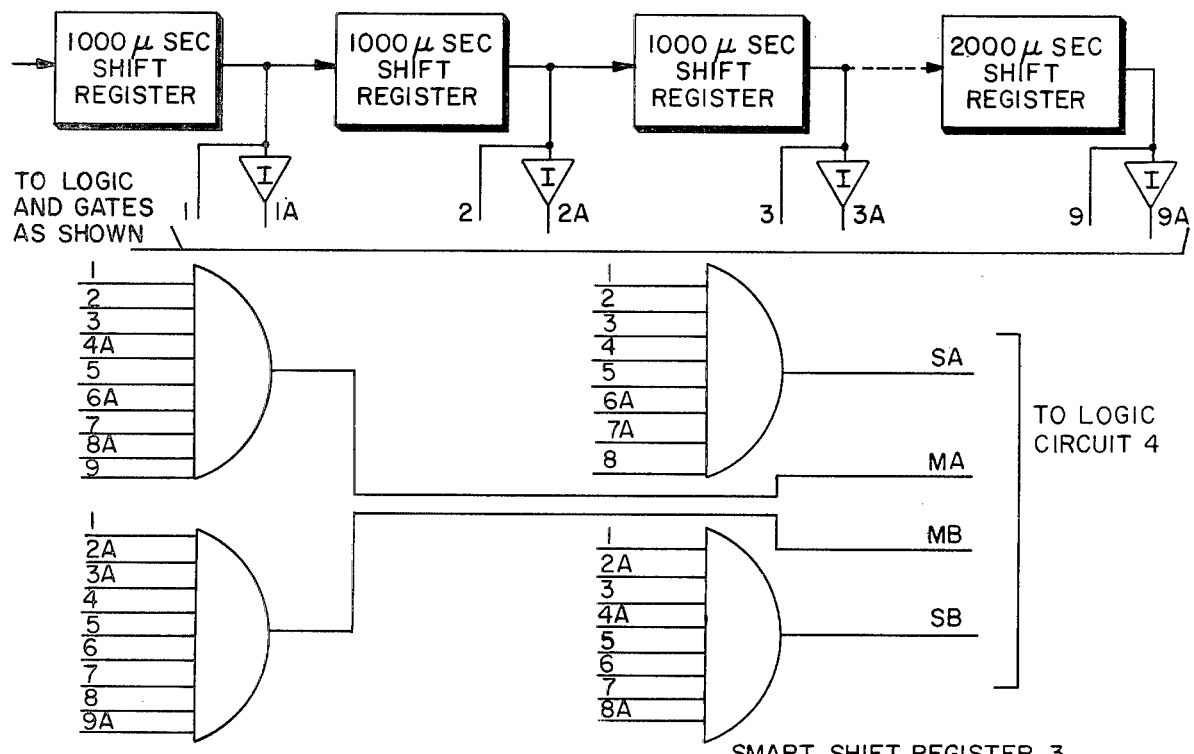
FIG. 10 is a detailed block diagram of the smart shift register shown in FIG. 5.

When our novel Loran-C equipment is initially placed in operation, it is in a coarse search mode wherein it is only trying to generally locate the pulse trains from the master and secondary stations of the selected chain. This function is accomplished by smart shift register 3 as now described. Limiter 17 in detector 6 hard limits the radio frequency signals input thereo from amplifier 81 so that only a chain of binary 1's is output from the limiter and input to register 3. Each of the binary 1's output from limiter 17 corresponds either to a spurious signal pulse or to each cycle of each pulse in the pulse trains from the master and secondary stations. These pulses are applied to smart shift register 3 which is shown in block diagram form in FIG. 5, but is shown in detail in FIG. 10 and will be described in detail further in this specification.

Smart shift register 3 is made up of a number of serially connected shift registers operating as a delay line. These shift registes store a window time sample of all received signals which are analyzed by logic circuits to determine if signal stored in the shift registers represents a pulse train from a Loran-C master or secondary station. Due to the clocking or shifting of register 3, the sample moves in time corresponding to the time rate of receipt of Loran-C signals. The logic gates connected to various stages of shift registers are used to analyze the signals stored in the register at any point in time to determine if the stored signal is from a master or secondary station and to determine if the received signals have what is referred to as A or B phase coding. These phase codes are well known to those skilled in the art. Upon smart shift register 3 determining that a pulse train has been received from a master or secondary station, the internal logic gates, which are described in greater detail further in the specification, apply an output signal on one of leads MA, MB, SA, or SB, indicating if the signal is from a master or secondary station and the particular phase coding thereof. The signal indication is stored in latch 21 which is connected to an input of multiplexer 8. In addition, the last named signal output from register 3 is applied via OR gate 22 and AND gate 98 to the SET input of flip-flop 23 to place this flip-flop in its set state with its 1 output high. The 1 output of R/S flip-flop 23 is applied via OR gate 24 to clocking input CK of latch 5. This causes latch 5 to store the contents of binary counter 26 in clock/counter 7 at the moment in time that it is determined that signals have been received from a master or secondary station. The contents stored in latch 5 are applied to multiplexer 8 to be input to microprocessor 9 and used in locating signals from the selected master and secondary stations.

Figure 6:
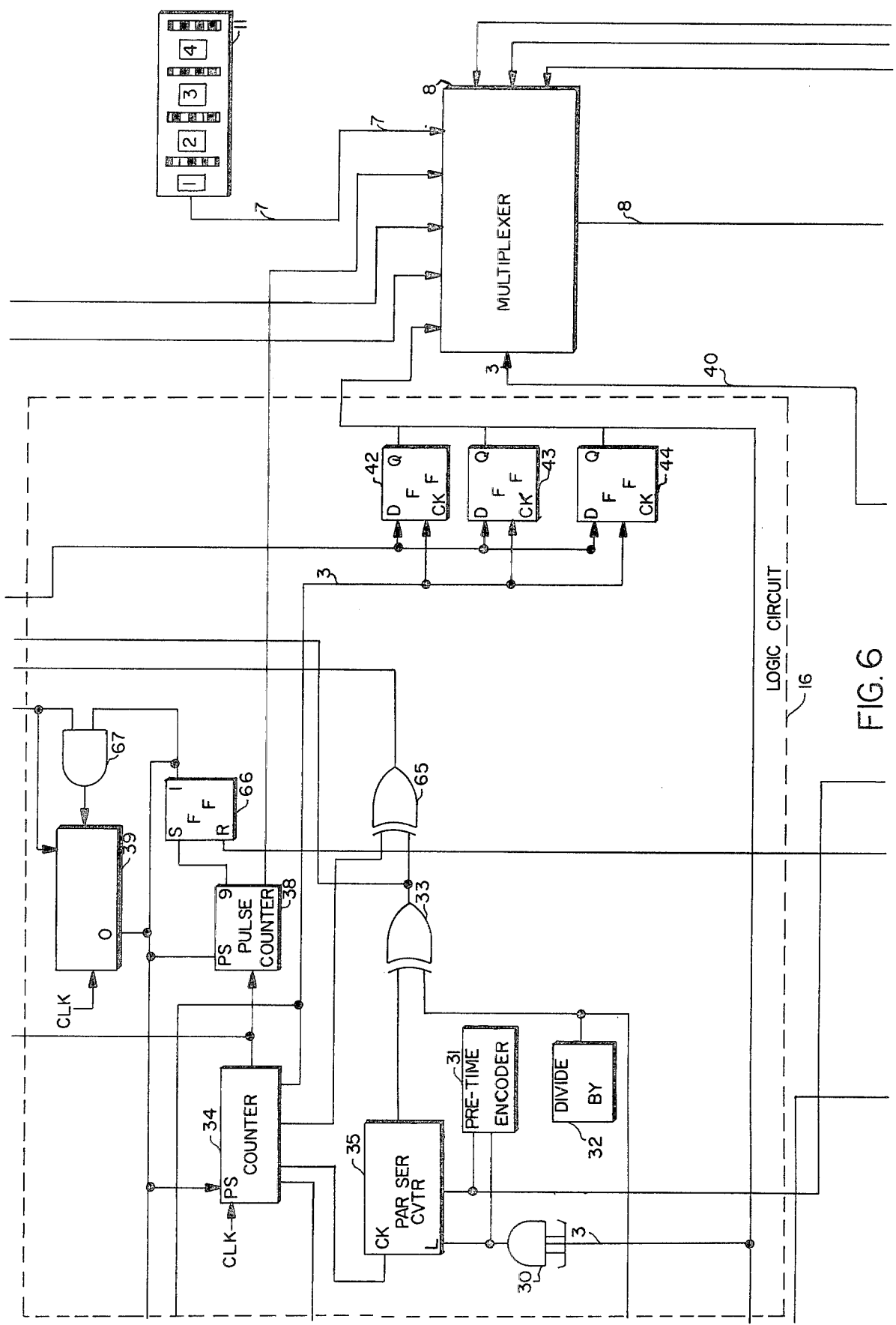
Figure 7:
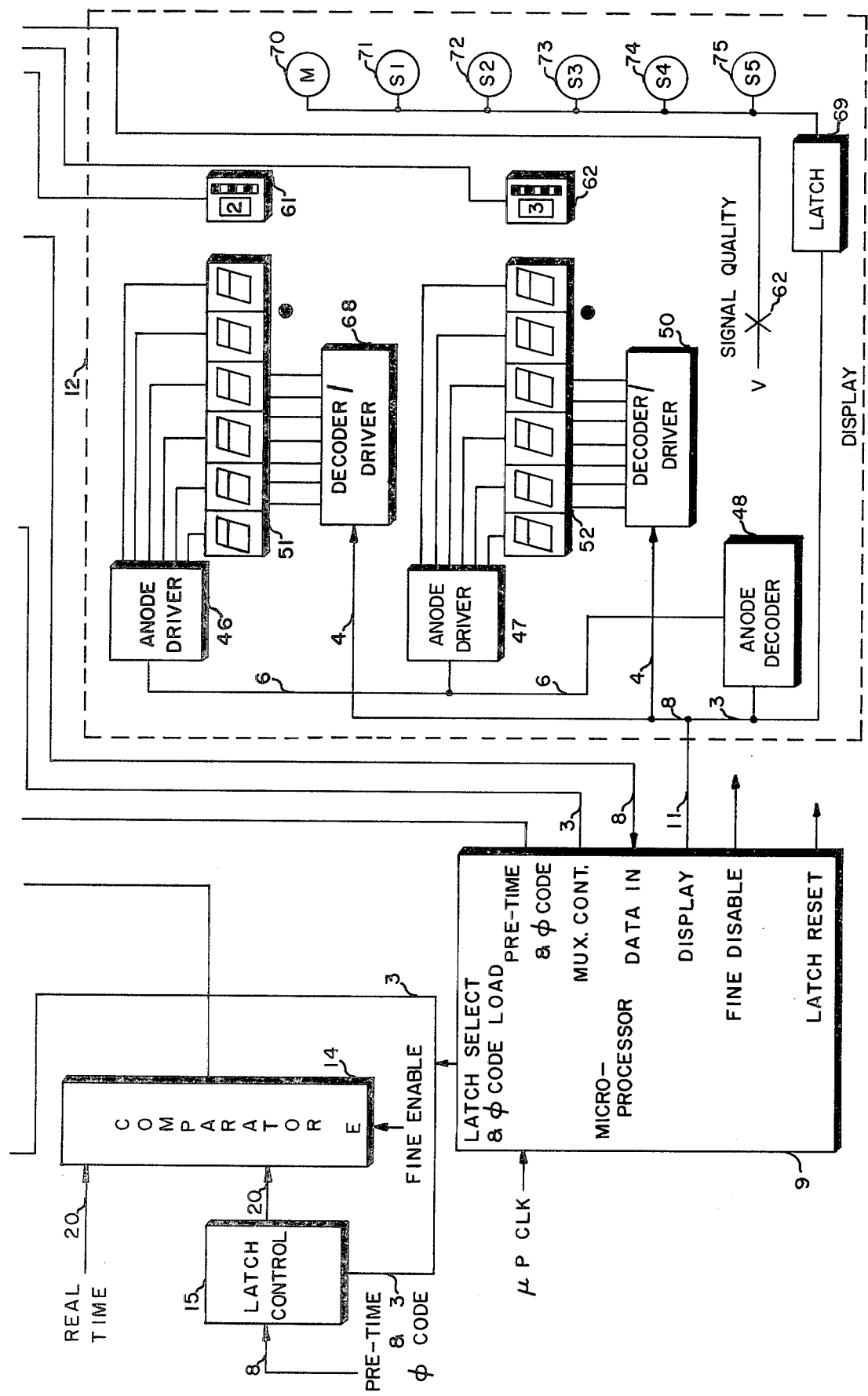

Multiplexer 8 in FIG. 6 is required to input signals to microprocessor 9 in FIG. 7 due to the limited number of input terminals to microprocessor 9 and the large number of leads having signals which must be applied to the microprocessor. Multiplexer 8 accomplishes this task utilizing time division multiplexing techniques. The signals input to multiplexer 8 from microprocessor 9 on leads 40 are used to control the operation of multiplexer 8. Integrated circuit multiplexers are avilable on the market but may also be made up of a plurality of two input logic AND gates, one input of each of which is connected to the leads on which are signals to be multiplexed, and the other input of each of which is connected to a clock and counter arrangement which causes ones or groups of the logic gates to have their other inputs sequentially energized in a cyclic manner.

Following microprocessor 9 receiving the contents of latch 5 via multiplexer 8, indicating the time of receipt of a pulse train from a master or a secondary station, the microprocessor outputs a signal on LATCH RESET which is applied to latches 21 and 5 to clear the information stored therein in preparation of storing a subsequent clock count indicating receipt of a master or secondary station signal. In addition, the LATCH RESET is used to return flip-flop 23 in its reset state.

As clock signals input to microprocessor 9 represent the receipt of master and secondary station signals from more than one Loran-C station chain, microprocessor 9 requires an input from the equipment operator using thumbwheel switches 11 to indicate a particular Loran-C chain of interest. The operator first consults a Loran-C hydrographic chart published by the U.S. Coast Guard and finds the group repetition interval (GRI) for the Loran-C station chain of interest and then enters the GRI via switches 11.

Microprocessor 9 is working in a coarse search mode at this point in operation of the receiver and stores the time of receipt of all master station signals which are compared to the GRI to identify which master station signals are from the selected Loran-C chain. With the stored time information for the desired master station microprocessor 9 can calculate the future time of receipt of signals from that master station. When the desired master station signals are being received at the calculated times, microprocessor 9 causes the receiver circuitry to go into a fine search mode utilizing a phase-locked-loop technique employing computer program and the loop is closed by cycle detector 82 and circuitry including logic circuit 16 and zero crossing detector 6.

In the fine search mode of operation which is the same for master and secondary stations, but is now described only for receipt of the master station signal, microprocessor 9 calculates a time 955 microseconds before the time of receipt of the next master station pulse train. This calculated time, called pretime, is output from microprocessor 9 on its Pre-Time and φ Code output and applied to the input of latch control 15. Microprocessor 9 also energizes its LATCH SELECT output to enable latch 15 to store the pretime present at its input. In addition, microprocessor 9 applies the phase code of the next received master signal to parallel to serial converter and energizes its load input to place the phase code in converter 35. In the fine search mode comparator 14 is enabled to compare the pretime stored in latch 15 with the Real Time count which is output from binary counter 26 in clock/counter 7. Upon there being a match between the Real Time count and the pretime, there is an output from comparator 14 to flip-flop 66 in logic circuit 16 placing the flip-flop in its reset state. Flip-flop 66 had placed in its one state priorly, as described further on, and its one output was high. This one output is connected to the preset to zero inputs PS of counter 34, pulse counter 38, timer 39 and also applied to gain control 76 to enable it to function. The PS inputs of circuits 34, 38 and 39 being high, not only preset them to zero but disabled them from operating. With comparator 14 now placing flip-flop 66 in its reset or zero state, circuits 34, 38, 39 and 76 are enabled to operate.

Counter 34 starts counting up to 9999, which is a one millisecond total, and various stages of this counter are connected to other circuits. The full or one millisecond count occurs for each pulse of the master station pulse train being received and is input to pulse count circuit 38 which is thereby incremented one count as each pulse is received, up to a maximum of nine pulses. Circuit 38 thus keeps track of which pulse is being received and applies this information via multiplexer 8 to microprocessor 9 which then knowns when to clear various circuits and prepare them for the next received master station pulse train. Upon circuit 38 achieving a full nine count it applies a signal to the set input S of flip-flop 66 to place it in its one state and preset circuits 34, 38 and 39 and disable circuits 34, 38, 39 and 76.

Counter 34 applies outputs to OR gates 88 and 89 in cycle detector 82 to identify two search windows used in locating the third cycle positive zero crossing of each pulse. There are three other outputs from counter 34 which are applied to the clocking input CK of flip-flops 42, 43 and 44. These flip-flops are used to take samples 65.0 microseconds, 58.8 microseconds and 52.5 microseconds before the third cycle positive zero crossing of each pulse to determine if there is another signal occurring in time before the signal whose arrival is calculated by microprocessor 9. This is done because the receiver may have locked onto a sky wave and the desired ground wave will be detected ahead of the calculated signal. Three samples are taken in case one sample occurs at a zero crossing or in case the sky wave and ground wave interface producing a null at one sample point. If microprocessor 9 determines from these samples prior in time to the calculated signal that there is an earlier signal having the same GRI, the microprocessor subtracts 40 microseconds from the calculated time and the procedures are repeated. This continues until no signal having the same GRI is detected prior to the calculated time of arrival, thereby indicating that the receiver has located and is locked onto the ground wave.

Once the ground wave is locked onto the third cycle positive zero crossing must be located for each pulse of the master station pulse trains. This is primarily the function of cycle detector 82 and zero-crossing detector 6.

In cycle detector 82 each received signal in its RF state from inverter 81 is applied undemodulated to 5 microsecond delay line 83 and to variable resistor 84 of cycle detector 82. The output of delay circuit 83 and resistor 84 are input to summing circuit 85 which sums the two RF signals being input thereto on a point-by-point, cycle-by-cycle basis to produce an RF output signal having a different waveform but of the same frequency as the input signals. The signals input to summing circuit 85 are shown in FIG. 12D, while the signal output from summing circuit 85 is shown in FIG. 12E. In FIG. 12D, the sinusoidal signal designated by waveform envelope 98 has the same envelope shape and same RF phase as the received RF Loran-C signal. Variable resistor 84 attenuates the received and undemodulated signal to produce the signal represented by waveform 100. Five microsecond delay circuit 83 delays the whole received signal by 5 microseconds while introducing little or no loss and the signal output from the circuit is represented by the sinusoidal signal having the waveform 100. The adjustment of variable resistor 84 is described hereinafter.

While variable resistor 84 and delay line 83 are disclosed as the preferred embodiment for long-term circuit stability and to produce the signals 98 and 100 having the relationship shown in FIG. 12D, many other circuit arrangements may be employed to achieve the same result. The same result may be accomplished with active and passive components in both paths.

Summing circuit 85 processes or algebraically combines the two RF signals 98 and 100 input therto on a point-by-point, cycle-by-cycle basis in a subtractive manner, due to these two signals being 180° out of phase with each other, to produce an output signal having the waveform 101 shown in FIG. 12E. It may be seen that the instantaneous carrier frequency of the output signal 101 is the same as the frequency of the two signals input to summing circuit 85. However, up to time $T_x$, the output signal 101 is in phase with signal 98, but thereafter undergoes a 180° phase shift and signal 101 is then in phase with signal 100. The phase is determined by which of the two signal inputs to summing circuit 85 has the greater amplitude and the phase change point is therefore adjustable by the setting of variable resistor 84. Variable resistor 84 is adjusted so that the amplitudes of signals 98 and 99 cross each other at point 99 which needs only be within the negative portion of the third carrier cycle of undelayed signal 98. Prior in time to point 99, which corresponds to time $T_x$, the amplitude of each cycle of signal 98 is greater than the amplitude of each cycle of signal 100, and this causes output signal 101 from summing circuit 85 to be in phase with signal 98. After time $T_x$, however, the amplitude of each cycle of signal 100 is greater than the amplitude of each cycle of signal 98 and output signal 101 is in phase with signal 100 as shown. Variable resistor 84 is adjusted to cause the phase reversal to take place during the 5 microsecond duration of the negative half of the third received Loran-C cycle and more particularly, to point 99 as shown in FIG. 12D in this embodiment of the invention.

In practice, however, variable resistor 84 may be adjusted such that the crossover point 99 of signals 98 and 100 in FIG. 12D occurs anywhere within plus or minus 2.5 microseconds of time $T_x$. This is any time during the negative half cycle of the third full cycle of signal 98.

Figure 12A:
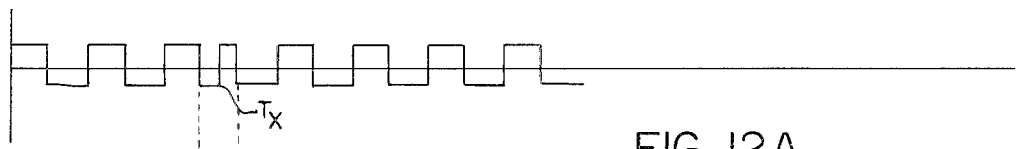
FIGS. 12A-12E show signals within the cycle detector.
Figure 12B:
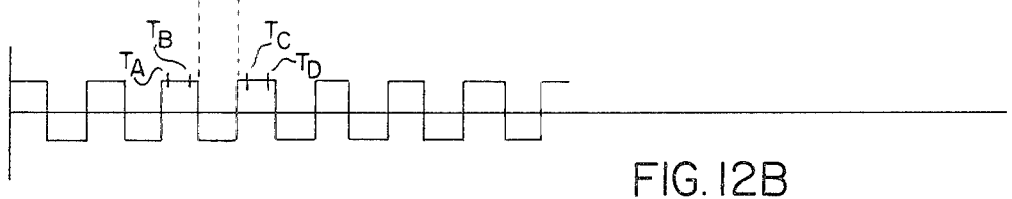
Figure 12C:
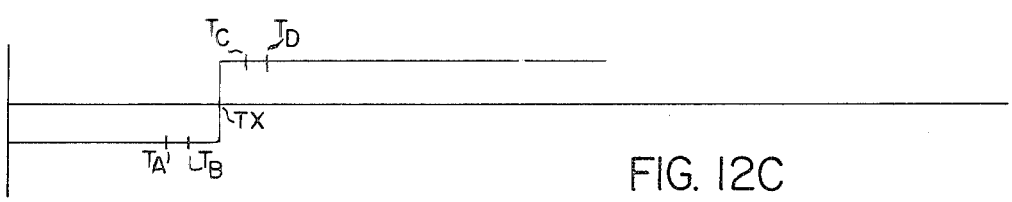
Figure 12D:
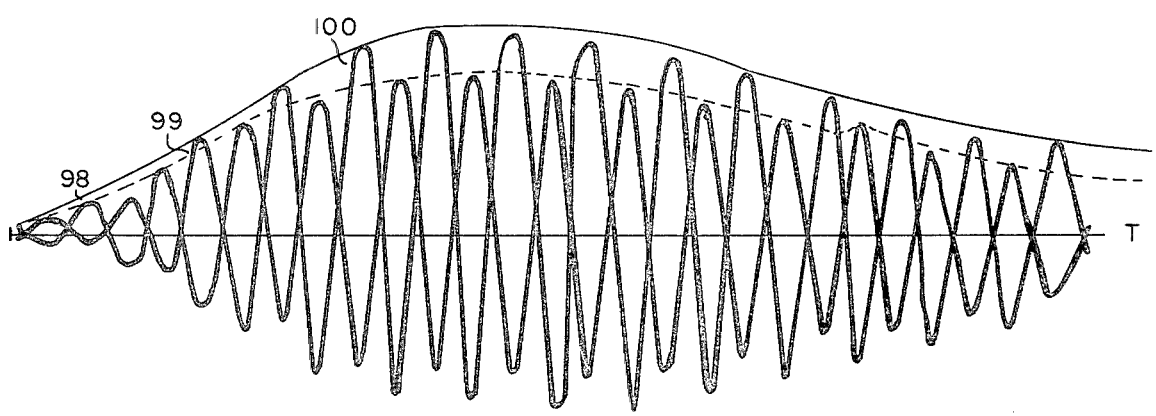
Figure 12E:
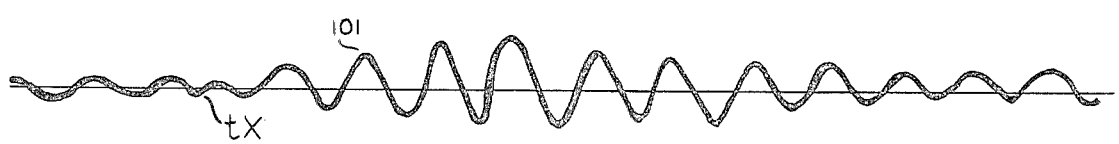

Signal 101 in FIG. 12E is output from summing circuit 85 and applied to limiter 86 which converts the radio frequency signal to a square wave by clipping the signal amplitude in a well-known manner to produce the binary waveform shown in FIG. 12A. The phase reversal which occurs at time $T_x$ is also shown in this figure.

The binary signal output from limiter 86 is input to exclusive OR gate 87. There is a second input to exclusive OR gate 87 from logic circuit 16. The waveform of this clock signal is shown in FIG. 12B. This clock signal is 100 KHz and includes phase code reversals (not shown) so that phase code phase shifts are removed and do not affect the operation of other circuitry in cycle detector 82. Exclusive OR gate 87 operates in a manner well known in the art and prior to time $T_x$ when the signals input to gate 87 as shown in FIG. 12A and FIG. 12B are in phase with each other, there is no output from gate 87. However, after time $T_x$ due to the phase reversal created by the action of summing circuit 85, it may be seen in FIGS. 12A and 12B that the signals input to gate 87 are no longer in phase with each other. As a result, starting at time $T_x$, the output of exclusive OR gate 87 goes high as shown in FIG. 12C. The high output from gate 87 is applied to counter enable input CE of counter 90 to enable this counter to operate in response to start and stop signals which will be described hereinafter.

As mentioned briefly heretofore the Loran-C receiver equipment including microprocessor 9 locates the transmissions from the master and each of the secondary stations from a selected Loran-C transmitter chain. After locating the signals transmitted by the master and secondary stations of the selected Loran-C chain at the GRI rate, microprocessor 9 calculates the expected time of arrival of subsequent received signals from these stations. At the expected start time of the first pulse of the pulse train from a master or secondary station, counter 90 is energized via logic circuit 16 and OR gate 88 to start counting the 10 MHz clock input thereto.

Figure 8:
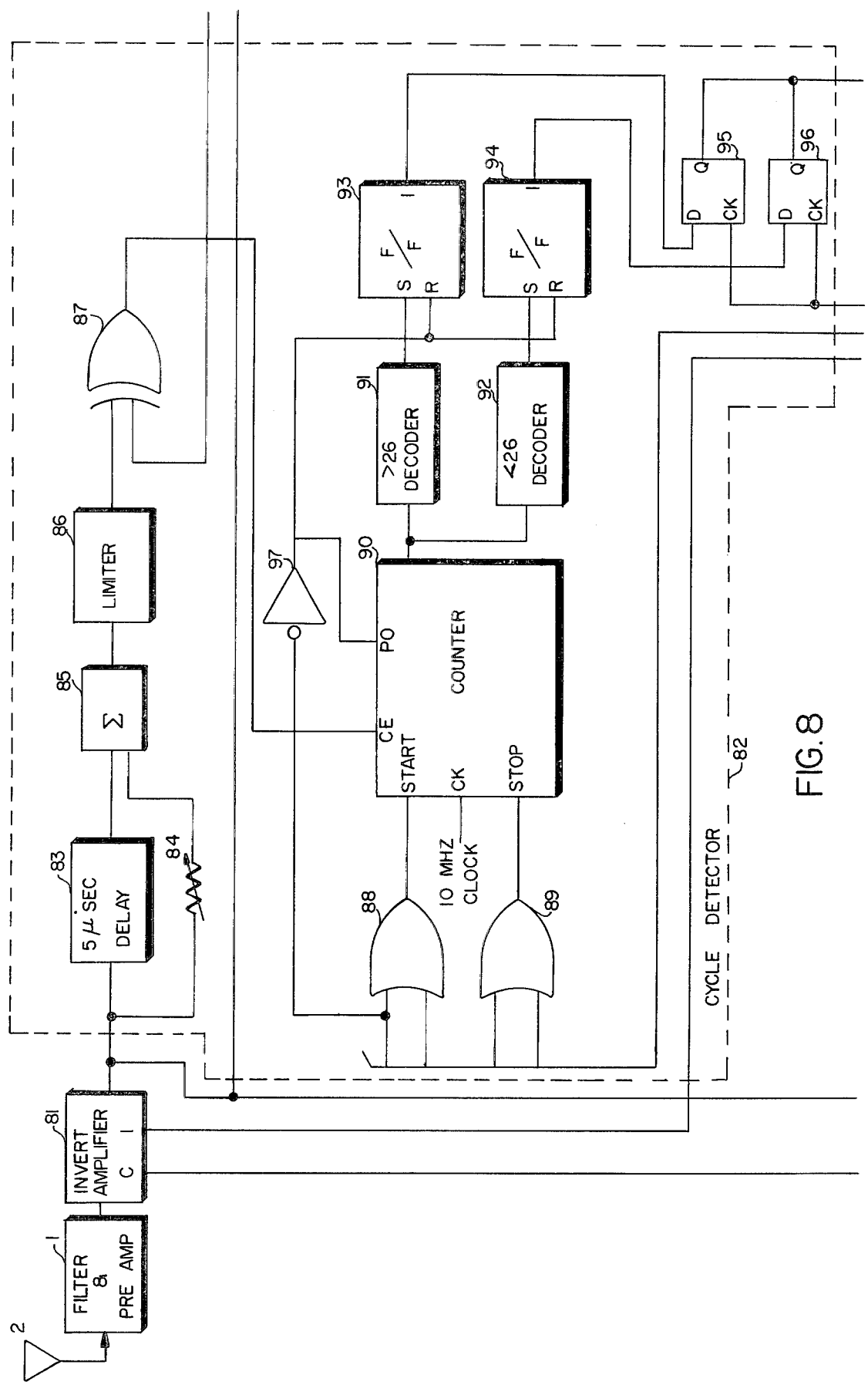

As may be seen in FIG. 8 there are four inputs to OR gates 88 and 89, and these sequentially go high once for each pulse of the pulse trains from both the master and secondary stations under the control of counter 34 in logic circuit 16. That is, each of these four inputs momentarily goes high once every 1000 microseconds. These times are represented by $T_a$, $T_b$, $T_c$ and $T_d$ in FIG. 12B. The two inputs to OR gate 88 are represented by times $T_a$ and $T_c$. The two inputs to OR gate 89 are represented by times $T_b$ and $T_d$. The output of OR gate 88 is connected to the start input of counter 90 while the output of OR gate 89 is connected to the STOP input thereof. When counter 90 is enabled to count, it counts pulses from a 10 MHz clock applied to its clocking input CK. Thus, as generally represented in FIGS. 12B and 12C, counter 90 is enabled to count at time $T_a$ and is then disabled from counter at time $T_b$. Directly thereafter, counter 90 is again enabled to count at time $T_c$ and is then disabled from counting at time $T_d$. These start and stop times open and close two 2.5 microsecond search windows set 12.5 microseconds apart to be placed by microprocessor 9 calculating pretime on either side of time $T_x$ for each pulse as shown in both FIGS. 12B and 12C. In each of these search windows, the signal output from exclusive OR gate 87 as shown in FIG. 12C is sampled a maximum of twenty-five times at 0.1 microsecond spacing. The search windows may be other than 2.5 microseconds wide and there may be many search windows. The results of this sampling are stored in counter 20 because the clock pulses are counted while input CE is jointly high and the count is decoded and checked by decoders 91 and 92. If the count in counter 90 is less than thirteen there is an output from decoder 91 and if the count is greater than thirteen there is an output from decoder 92. The results of the decoding by decoders 91 and 92 will be an output of 00, 01, 10 or 11 for each pulse and the results are temporarily stored in flip-flops 93 and 94. The results are then transferred to flip-flops 95 and 96 upon being clocked therein under the control of an output of counter 34 in logic circuit 16.

In the ideal case, with no received noise or spurious signals, and detector 82 is in phase with the received signal pulse, the zero to one transition of the signal output from exclusive OR gate 87 as shown in FIG. 12C is stable at time $T_x$. However, in actual operation, noise and spurious signals cause this transition to fluctuate in time, that is not to occur at precise time intervals. In addition, spurious momentary spike-like transitions occurring prior to or after time $T_x$ can also be mistakenly identified as the desired transition at time $T_x$ and degrade reliable Loran-C receiver operation. Further, non-phase coherence between the received signal and the clock driving gates 88 and 89 will cause the zero to one transition output from gate 87 to occur earlier or later than $T_x$. All of these affect the count in counter 90 for each pulse.

To minimize the effect of the above problems, the search windows between time $T_a$ and $T_b$ and times $T_c$ and $T_d$ are utilized. More particularly, twenty-six samples are taken within each search window and an analysis is initially made by decoders 91 and 92 for each pulse. Flip-flops 95 and 96 forward the signal outputs of decoders 91 and 92 for every pulse via multiplexer 8 to microprocessor 9 which develops a histogram for a large number of pulses. The histogram is analyzed to decide if the microprocessor calculated time of arrival should be revised.

In the ideal signal case with no transients or fluctuations as shown in FIG. 12C, at any time prior to time $T_x$, the output of exclusive OR gate 87 in FIG. 8 is low and does not enable counter 90. At time $T_a$, which is 941.3 microseconds after the start of pretime upon which counter 34 is enabled, OR gate 88 enables the start input of counter 90 as mentioned previously, but cycles of the 10 MHz clock input to counter 90 cannot be counted as counter enable input CE is not energized by gate 87. Thereafter, OR gate 89 provides a stop signal to counter 90 at time $T_b$ which is 2.5 microseconds later than start signal $T_a$. In this case counter 90 has a zero count therein immediately following the search window between $T_a$ and $T_b$. The zero count is detected by decoder 92 which provides an output to set flip-flop 94 to its one state whenever there is a count less than thirteen in counter 90. Also, decoder 91 will maintain a zero output which will be applied via flip-flops 93 and 95 and multiplexer 8 to microprocessor 9. Thus, microprocessor 9 receives an 01 signal indicating correct location of the point immediately preceding the third cycle positive zero crossing. The next output from zero crossing detector 6 is then the desired zero crossing.

In the event transients occur within the search window between times $T_a$ and $T_b$, the transients each cause counter enable input CE of counter 90 to go high. For the extremely brief period of time defined by the transients within the search window, a cycle of the 10 MHz clock applied to clocking input CK is counted by counter 90. If more than one transient appears within this first search window, multiple counts will appear in counter 90. Satistically, the number of counts in counter 90 will be less than thirteen for the search window defined by $T_a$ to $T_b$ when the sample point is prior to time $T_x$ in FIG. 12C.

For a perfect received signal with no noise or spurious signals the output from exclusive OR gate 87 will always be high during the search window between times $T_c$ and $T_d$ which starts 12.5 microseconds after $T_b$ and which must be adjusted by calculation of pretime to occur after time $T_x$. During this latter search window which is also of 2.5 microseconds duration in this embodiment of my invention there will also occur twenty-five pulses from the 10 MHz clock applied to clocking input CK of counter 90 resulting in a count of twenty-five being stored in counter 90. This count of twenty-five is detected by decoder 91 as being a count greater than thirteen which places flip-flop 93 in its set state. Flip-flop 93 being in its set state provides an indication to microprocessor 9 that the signal level occurring within the $T_c$-$T_d$ search window is at one level.

Noise transients occurring within the search window between $T_c$ and $T_d$ will cause the one level to go to a zero level. This means that the output of exclusive OR gate 87 goes to zero during this latter search window for each transient, which in turn disables counter 90 from counting a cycle of the 10 MHz clock. Statistically, transients will not cause a count of less than thirteen in counter 20 between times $T_c$ and $T_d$ if counter 90 is started at the proper time by outputs of OR gate 88 ultimately under the control of microprocessor 9. The equal to or greater than thirteen count in counter 90 is detected by decoder 91 which places flip-flop 93 in its one state. Microprocessor 9 takes the one output of flip-flop 93 via flip-flop 95 and multiplexer 8 to indicate that the signal level within the search window between $T_c$ and $T_d$ is at a one level.

With the operation of the circuitry in FIG. 8 just described, it can be seen that the circuitry develops and analyzes samples within each of the two search windows that are adjusted to be on either side of the transition occurring at time $T_x$ which points to the desired cycle of the carrier frequency which occurs immediately thereafter. The effect of the histograms developed by microprocessor 9 from the outputs from cycle detector 82 is to statistically eliminate the effect of noise transients and spurious signals that occur within the 2.5 microseconds search windows that microprocessor 9 jointly shifts to be placed on either side of the transition at time $T_x$. In addition, phase incoherence between the received signal and signal outputs from counter 34 controlling the sample windows will not affect cycle detector 82 in conjunction with revised pretime calculations by microprocessor 9 from accurately indicating that the next positive zero crossing indication by detector 6 is for the desired third cycle. Thus, the desired zero crossing of each Loran-C pulse occurring immediately after the transition at time $T_x$ is easier to locate and time difference of Loran-C signal arrival measurements are made more accurately, even in noisy signal environments wherein the signal-to-noise ratio of the received signal is low.

The circuit operation just described wherein the two search windows straddle the transition at $T_x$ is premised on the assumption that microprocessor 9 functioning with the other receiver circuitry has started counter 34 in logic circuit 16 at the proper time. In reality, this does not occur because in the rough search mode the tracking point of each pulse is not determined within a few microseconds. Thus, the two search windows may not intially be one on either side of the transition occurring at time $T_x$ for each pulse. If both search windows initially occur prior to the transition at time $T_x$, the histogram assembled by microprocessor 9 from cycle detector 82 outputs will have a zero count for both search windows. Microprocessor 9 responds to this zero-zero histogram indication that it develops over many pulses to increment the calculated time to arrival of the pulse trains from the master and secondary station by increments of 10 microseconds, which are multiples of one carrier cycle, and thereby ultimately enables counter 90 to start counting at a later time equal to the increment. The process described for cycle detector 82 is then repeated and microprocessor 9 again analyzes the results. If the result is again a zero-zero count for both search windows, microprocessor 90 again increments the calculated time of arrival until the desired zero-one histogram count occurs indicating that the transition at time $T_x$ has been located.

In a similar manner, if microprocessor 9 receives an indication of a one count within both search windows, the calculated time of arrival of the Loran-C signals is decremented and the procedure is repeated. This decrementing or incrementing process is continued until microprocessor 9 receives a zero count for the search window occurring between times $T_a$ and $T_b$ and a one count for the search window occurring between times $T_c$ and $T_d$. In this manner, circuitry of FIG. 8 functioning in conjunction with microprocessor 9 accurately locates the transistion at time $T_x$ and thereby knows that the next positive zero crossing of the carrier is the desired third cycle positive zero crossing of the received pulse signal used to make the time difference of signal arrival measurements.

Thus, microprocessor 9 functioning with the other receiver circuitry operates as a phase-locked-loop with cycle detector 82 and zero crossing detector 6 more particularly closing the loop to allow the receiver to accurately locate the third cycle positive zero crossing of each pulse. This operation occurs in the fine search mode for the master and all secondary stations.

In the prior art Loran-C receiver circuitry sampled and analyzed received signals to first identify master and secondary station signals and then to locate the third cycle positive zero crossing tracking point. This process was designed to take at least several minutes to assure that the tracking point was accurately located or acquired as the signal-to-noise ratio could be very low. However, this long acquisition time was still used even when strong signals were received resulting in a high signal-to-noise ratio. Unlike the prior art our novel receiver provides adaptive signal acquisition wherein in a strong signal environment with a high signal-to-noise ratio the high signal-to-noise ratio is determined and time difference of signal arrival measurements are output to the operator in a matter of seconds. In a weak signal environment, however, a signal-to-noise ratio is determined and a longer time is required to provide the output to the operator.

To accomplish this, cycle detector 82 is utilized in conjunction with microprocessor 9. As previously described, microprocessor 9 and the other receiver circuitry cooperate in a phase-locked-loop mode to locate a specific point at time $T_x$ a few microseconds before the tracking point. Upon accurately locating the specific point, the output from detector 82 to microprocessor 9 is a zero-one indication as previously described. A zero-one indication will be given to microprocessor 9 for every pulse in a perfect signal environment. However, as the signal-to-noise ratio decreases, the zero-one histogram developed by microprocessor 9 will show fewer and fewer zero-one counts for a given number of samples. In addition, increased noise will cause an increase in the one-zero output from cycle detector 82 to microprocessor 9. The one-zero output is caused strictly by noise. Microprocessor 9 is programmed to compare the result of the zero-one histogram with the one-zero histogram, both of which it develops, to derive a signal quality figure. This signal quality figure indicates to microprocessor 9 how to adjust the adaptive signal acquisition. In addition, the Loran-C receiver operator may operate a front panel control entitled SIGNAL QUALITY to get a readout on display 51 and 52 of this derived signal quality figure for the master and secondary stations being utilized to make the displayed time difference of signal arrival measurements.

On the front panel of the Loran-C receiver are lamps 70 through 75 respectively entitled M, 51, 52, 53, 54 and 55 and associated with master and secondary stations of the selected Loran-C chain. While particular ones of these stations are being acquired, the associated one of the lamps is flashed by microprocessor 9. After the signal has been acquired for any particular station and time difference of signal arrival measurements can reliably be made utilizing that particular station, the associated one of lamps 70 through 75 is lit steady. In this manner, the receiver operator knows which secondary stations can be relied on when identifying stations with thumbwheel switches 61 and 62 to be used to make time difference of signal arrival measurements.

Once master station signals of the selected Loran-C chain have accurately been acquired using the coarse and fine search modes previously described, the receiver circuitry then goes into the secondary station coarse search mode. In this mode, microprocessor 9 divides the time interval between receipt of any two master station signals up into a number of time slot bins. As indications are received from smart shift register 3 and logic circuit 4 of received secondary station signals, as well as indication of the time received from clock-/counter 7 via latch 5, a count is placed in an appropriate computer program created time slot bin. The contents of the bins are analyzed by microprocessor 9 to locate the secondary station signals for the selected Loran-C chain. Once located, for each secondary station the particular time slot bin for a secondary station as well as the slot on either side thereof are broken down into a large number of time slot bins each of shorter time duration. Again the above process is repeated to more closely identify the time of arrival of the desired secondary station signals. Then microprocessor 9 can begin to calculate the approximate time of arrival of the secondary station signals. At this time microprocessor 9 causes the other circuitry to change to fine search mode which is the same for the secondary stations as it was for the master station which fine search mode was previously described in detail. Again, when a zero-one histogram is developed by microprocessor 9 for each secondary station, the microprocessor knows that the next positive zero crossing detected by zero crossing detector 6 is the desired third cycle positive zero crossing.

In the fine search mode for master and secondary stations microprocessor 9 stores and analyzes by integration the latch 5 indicated times of receipt for the third cycle positive zero crossing for all master and secondary station pulses to make sure they are accurately located and then the time difference of signal arrival measurements are made and displayed for the secondary stations identified by the receiver operator using thumbwheel switches 61 and 62.

Figure 5:
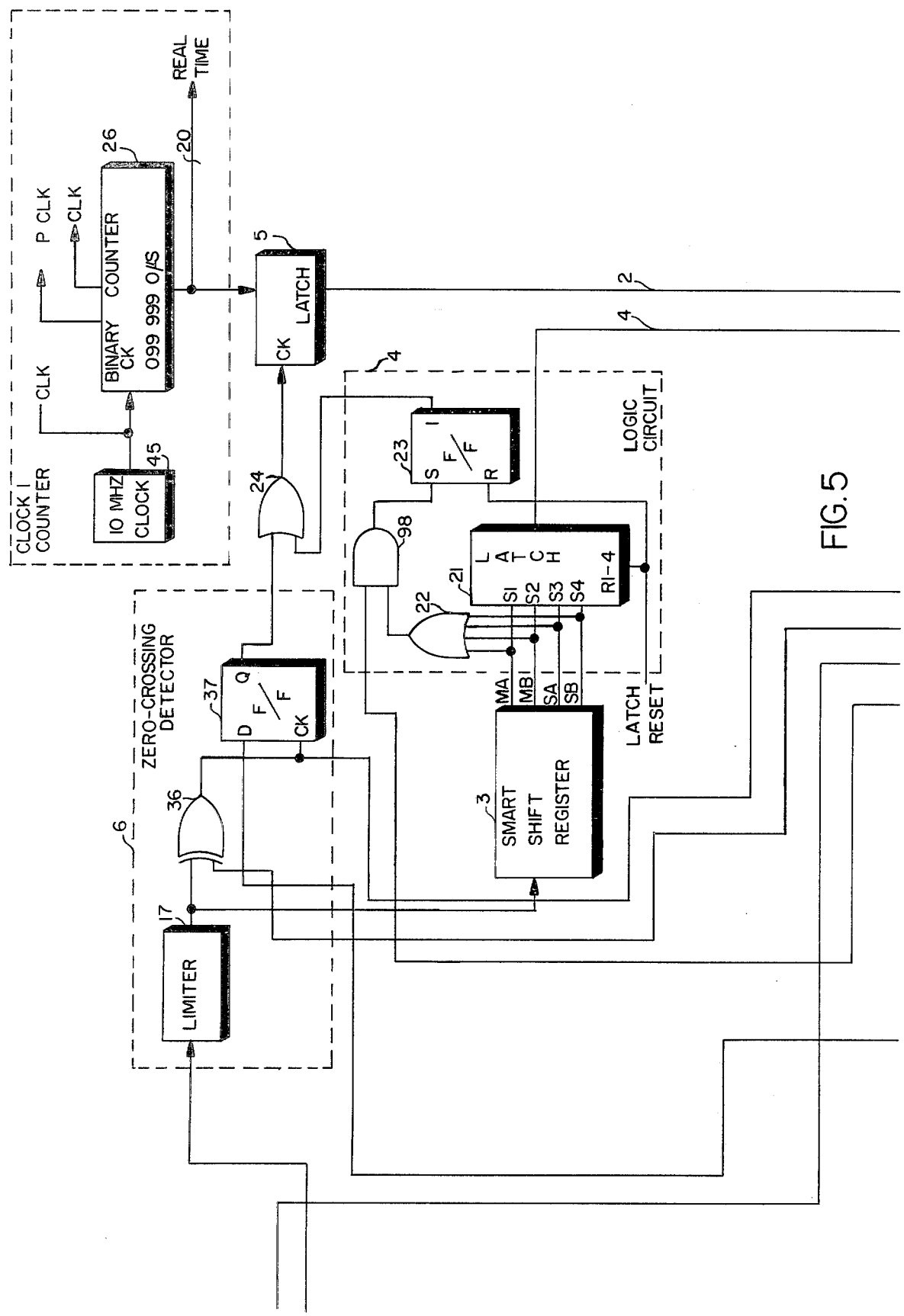

The operation of zero crossing detector 6 in FIG. 5 is now described. It can be seen that the input to detector 6 is from inverting amplifier 81 in FIG. 8. The input is still the 100 KHz radio frequency signal which is hard limited by limiter 17 to produce a binary signal at the 100 KHz frequency. This signal passes through exclusive OR gate 36 and is applied to the clocking input CK of flip-flop 37. The D input of flip-flop 37 is controlled by counter 34 in logic circuit 16 and goes high at the beginning of each received pulse.

Flip-flop 37 in detector 6 being placed in its set state with its one output high upon both its inputs being high, causes latch 5 to store the contents of counter 26 at that particular moment in time. Microprocessor 9 thereby receives a time indication of the beginning of each radio frequency cycle of each of the pulses and this information is used to make the required time difference of arrival measurements which are the basis or the Loran-C system. Flip-flop 37 is returned to its reset state before the beginning of the first cycle of a subsequent pulse received from a master or secondary station by the LATCH RESET signal as described heretofore.

Microprocessor 9 thereby has a multiplicity of clock times, once for each positive zero crossing, being entered into latch 5. They are all ignored, however, except for the desired third cycle positive zero crossing. As previously described, microprocessor 9 functions with other circuitry including particularly cycle detector 82 to adjust the calculated time of arrival and receive an indication at time $T_x$ as previously described for detector 82 which will occur a few microseconds before the third cycle positive zero crossing for each pulse. Thus, in response to the time $T_x$ determination by microprocessor 9, only the clock time for the third cycle positive zero crossing for each pulse is actually taken by microprocessor in the fine search mode for both master and secondary stations for the time difference of signal arrival measurements.

As is well known in the art, each of the pulses of the pulse trains received from master and secondary Loran-C stations is phase coded. This phase coding must be removed within our Loran-C receiver or 5 microsecond time measurement errors can occur. To accomplish this, when microprocessor 9 changes the receiver over to the fine search mode for either master or secondary station signal acquisition, the microprocessor parallel loads the phase coding for the first eight pulses of the next to be received master or secondary station pulse train of the selected Loran-C chain into parallel/serial converter 35 of logic circuit 16 via its φ code load output. Converter 35 is a conventional shift register well known in the art which may be loaded in parallel and then shifted out in serial to perform parallel to serial conversion. This phase coding is stored in microprocessor 9 and is selected by information input to the equipment by the operator using thumbwheel switches 11. The clocking input CL to converter 35 is 100 KHz and the phase code contents of converter 35 are serially shifted out at a 100 KHz rate. The output Q of converter 35 is connected via exclusive OR gate 33 to one of the two inputs of exclusive OR gate 36 in zero crossing detector 6. Exclusive OR gate 36 functions as an inverter in this case in a manner well known to circuit designers. When a particular one of the pulses of the pulse trains received from a master or secondary station is of a positive phase there is no signal or a zero on output Q from converter 35. The result is that each radio frequency cycle of a pulse is hard limited by limiter 17 and will pass directly through exclusive OR gate 36 to flip-flop 37 phase unchanged. Upon the expected receipt of a pulse which is to be of a negative phase, converter 35 will have a one at its output which causes gate 36 to invert the phase of the pulse output from limiter 17. That is, the signal being input to detector 6 is effectively shifted 180° thereby eliminating the negative phase coding applied to the particular pulse. This is done in order that there will be an output from exclusive OR gate 36 to place flip-flop 37 in its set state at exactly the beginning of each pulse of the pulse trains from the master and secondary stations irregardless of phase shift.

A second phase code shifting function is accomplished within the receiver to average out internally generated noise within the front end circuitry of the receiver which noise normally creates a bias level which seriously affects the ability to locate the third cycle positive zero crossing of each pulse. After the receipt of two master station pulse trains the phase of all signals is inverted within the receiver to average out the noise.

Master pretime encoder 31 in logic circuit 16 is incremented by one each time a master station phase code is loaded into parallel to serial converter 35. Encoder 31 is connected to divider 32 which divides the contents of encoder 31 by four. The output of divider 32 is input to exclusive OR gate 33 which now functions as a phase inverter and inverts the entire phase code shifted out of converter 35. The output of divider 32 is also applied to the inverting input I of inverting amplifier 81 in FIG. 8. This causes all received signals to undergo a 180 degree phase shift after every two received master station pulse trains. The effect of this periodically alternating phase shift is removed at zero crossing detector 6 where internal noise is no longer a problem. Counter 34 causes gate 65 to reshift the phase code before being applied to gate 36 in zero crossing detector 6. Gate 36 then causes the alternating phase code reversal to be removed.

A gain control circuit 76 in FIG. 9 is also provided to automatically adjust the gain level of amplifier 81 in FIG. 8 to thereby assure that the signal level to other circuitry in the receiver is sufficient for proper operation of the circuitry. Potentiometer 77 is connected as a voltage divider and is adjusted to apply a predetermined voltage to one of the two inputs of comparator 78. The other input to comparator 78 is connected to the output of amplifier 81 to monitor the signal level. When the signal level output from amplifier 81 becomes too low, there is a high output from comparator 78 which is connected to one of the two inputs of AND gate 79. The other input of gate 79 goes high when flip-flop 66 in logic circuit 16 is placed in its reset state at the beginning of the calculated pretime. Thus, there is an output from gate 79 to place flip-flop 80 in its set or one state when the signal output from amplifier 81 is too low and at the beginning of pretime. Flip-flop being in its set state applies a signal to the control input C of amplifier 81 causing it to change to a higher gain level. The reset input of flip-flop 80 goes high returning it to its zero or reset state under control of the same signal that causes the calculated preset time to be loaded into latch 15 in FIG. 7. Thus, the gain of amplifier 81 is returned to its normal lower level prior to receiving each pulse train from a master or secondary station.

The signals output from microprocessor 9 to display 12 are applied to the appropriate digital display units therein. Digital display unit 51 is used to visually display the time difference of arrival information for one selected secondary station, and digital display 52 is used to visually display the time difference of arrival information for a second selected secondary station. The inputs to these digital displays is encoded and is appropriately decoded by anode drivers 46 and 47, anode decoder 48 and decoder/drivers 50 and 68 to drive digital displays 52 and 51 respectively. These displays along with their associated decoding and driving circuitry are well known in the art and are commercially available. In this embodiment of our invention, displays 51 and 52 are Itron FG612A1 flourescent displays, but they may also be light emitting diode displays or liquid crystal displays, or any other form of visual display.

To select the secondary stations, the time difference of arrival measurements for which are to be displayed on displays 51 and 52, thumbwheel switches 61 and 62 are provided. Switch 61 is physically adjacent to display 51 and one of the numbers "1" to "5" are selected with this switch to indicate to processor 9 the information to be displayed. Similarly, thumbwheel switch 62 is associated with display 52 and is used by the equipment operator to indicate the particular secondary station arrival measurement to be displayed on display 52. Switch 11 shows no details but is made up of four individual switches such as represented by switch 61 in FIG. 7. The operation of a detented thumbwheel brings numbers into a window and output terminals of the switch indicates the chosen number to microprocessor 9.

As highlighted in the Summary of the Invention, our novel LORAN-C receiver never needs calibration. The operation of the system to implement this feature was previously described in the General Description portion of this specification. Microprocessor 9 functioning with the other circuitry identifies signals transmitted by Master stations and locates the third positive cycle zero crossing tracking point as described. Microprocessor 9 also knows the exact time difference of signal arrival of the pulse trains from the master station of the selected LORAN-C chain because of the GRI input thereto via switches 11. The LORAN-C transmitters are controlled by cesium frequency standards as detailed previously, and the GRI time difference of signal arrival between successive received pulse trains from the master station, and between each pulse of the pulse trains is as accurate as could be obtained with frequency standard test equipment.

Our novel receiver utilizes the very accurate time difference of signal arrival of received master station signals to avoid the need to calibrate the internal clock/counter 7 and to avoid the need for temperature controlled ovens for the crystal of the oscillator, while achieving accurate time difference of signal arrival measurements.

As previously described, the output of clock/counter 9 is compared with the time difference of signal arrival from the master station of the selected LORAN-C chain to determine the frequency error of the oscillator. Microprocessor 9 is programmed to interpolate the error of clock/counter 7 over a GRI and a correction factor is added or subtracted to all clock indications applied to the microprocessor via multiplexor [indicating time of receipt of pulses received from the master and secondary stations. Thus, accurate time difference of signal arrival measurements are made without the need to ever calibrate clock/counter 7 utilizing test equipment.

The following program listing shows the complete source programs for the operation of microprocessor 9 in our Loran-C receiver. The programs are written in the PL/M language of Intel Corporation and must be run through a compiler to obtain the machine code to be loaded into the 8080 microprocessor used in our receiver. Descriptive headings are provided throughout the program listing to identify sub routines that implement various functions of the program.

APPENDIX I

MAIN PROGRAM MODULE

ISIS-II PL/M-80 Y3.0 COMPILATION OF MODULE LORAN
OBJECT MODULE PLACED IN F1 MAIN OBJ
COMPILER INVOKED BY:   PLM80   F1:MAIN SRC

```
            $DATE(09 APR 78)
            $DEBUG
            $PAGEWIDTH(96)
            $TITLE('MAIN PROGRAM MODULE')

/*  DECLAR. JD[12780,22506]    J. DELANO      04/09/78 */

1           LORAN:
            DO; /* BEGINNING MAIN PROGRAM MODULE */

/* LORAN C PROGRAM DECLARATIONS */

2    1      DECLARE LIT LITERALLY 'LITERALLY',
                    DCL LITERALLY 'DECLARE';

3    1      DCL EXT LIT 'EXTERNAL',
                PUB LIT 'PUBLIC';

/* DISPLA DECLARATIONS */
4    1      DCL (DIGIT, DSDIG,DISP1, DISP2) BYTE PUB;
5    1      DCL (SEGN1, SEGN2, NBCD1, NBCD2,SIGLIT) (6) BYTE PUB;
6    1      DCL IN1 LIT '0E4H',
                OUT1 LIT '0E8H',
                OUT2 LIT '0E9H',
                OUT3 LIT '0EAH',
                OUT4 LIT '0E5H',
                OUT5 LIT '0E6H',

/* B$BCD AND BCD$B DECLARATIONS */
7    1      DCL (BIN0,BIN1,BIN2,BCD0,BCD1,BCD2,BCD3,BCD4,BCD5) BYTE PUB;
8    1      DCL (BCDPTR,BINPTR) ADDRESS PUB;

/* NO GLOBAL DECLARATIONS USED SEG7 */

/* READ DECLARATIONS */
9    1      DCL TRUE LIT '0FFH';
10   1      DCL FOREVER LIT 'WHILE TRUE';
11   1      DCL MUXCON BYTE PUB;
12   1      DCL (MUX0,MUX1,MUX2,MUX3,MUX4,MUX5,MUX6,MUX7) BYTE PUB;

/* MASTER$COARSE DECLARATIONS */
13   1      DCL (MFOUND,MCOUNT,MASPTR,PHSPIR,PHASER,CORRELATE) BYTE PUB;
14   1      DCL MTIME(24) BYTE PUB:
15   1      DCL MPHASE(8) BYTE PUB:
16   1      DCL (MBIN0,MBIN1,MBIN2) BYTE PUB;
17   1      DCL (TEMP0,TEMP1,TEMP2) BYTE PUB;
18   1      DCL (MREF0,MREF1,MREF2,MPRED0,MPRED1,MPRED2) BYTE PUB;
```

```
19  1      DCL ELAPTIM BYTE PUB;
20  1      DCL MPHASA LIT '1100$1010B';
21  1      DCL MPHASB LIT '1001$1111B';
22  1      DCL SPHASA LIT '1111$1001B';
23  1      DCL SPHASB LIT '1010$1100B';

/* MASTER$FINE DECLARATIONS */
24  1      DCL (MPHASEA,MPHASEB,MPHASEC,MASCNT) ADDRESS PUB;
25  1      DCL MPHASED (4) ADDRESS PUB;
26  1      DCL (PLSCNT,SWCNT,SKYWAVE,RIGHT,LEFT) BYTE PUB;
27  1      DCL (SUB0,SUB1,SUB2,TEMPA0,TEMPA1,TEMPA2) BYTE PUB;
28  1      DCL (GRI0,GRI1,GRI2,MSUM0,MSUM1,MSUM2,MSUM3,DIVISOR,EXP) BYTE PUB;
29  1      DCL (COHERENCY,UPRLIM,FASTSETL,INTEGRATION) ADDRESS PUB;
30  1      DCL (MAXINT,INTEGRATM,SIGMAM0,SIGMAM1) ADDRESS PUB;
31  1      DCL (PRETIME0,PRETIME1,PRETIME2) BYTE PUB;
32  1      DCL (CORRECT0,CORRECT1,CORRECT2) BYTE PUB;
33  1      DCL (CYCLE$ERR$M,MSN0,MSN1,MSN2) BYTE PUB;
34  1      DCL PHASED$STORE (4) ADDRESS PUB;

/*SLAVE$COARSE DECLARATIONS */
35  1      DCL (SFOUND,SORTBIN,SORT) (5) BYTE PUB;
36  1      DCL MASK (5) BYTE PUB;
37  1      DCL CFBIN (128) BYTE PUB;
38  1      DCL FFBIN (96) BYTE PUB;
39  1      DCL (BINTME0,BINTME1,BINTME2) BYTE PUB;
40  1      DCL (PTR,MPTR,BINCNT,PTRMAX) BYTE PUB;
41  1      DCL (CNT,CNT3,CNT4,NEXT) BYTE PUB;

/* SLAVE$FINE DECLARATIONS */
42  1      DCL (SBIN0,SBIn1,SBIN2,SC0,SC1,SC2,SC3,SL0,SL1,SL2,SL3) BYTE PUB;
43  1      DCL (SNUMB,PHASOUT,PHI0,PHI1) BYTE PUB;
44  1      DCL (SLVCNT,INTEGRATS,SPHASEA,SPHASEB,SPHASEC) ADDRESS PUB;
45  1      DCL (SIGMAS0,SIGMAS1) ADDRESS PUB;
46  1      DCL SPHASED (4) ADDRESS PUB;
47  1      DCL (SIGMASA,SIGMASB,LOOP$FACTOR) (5) ADDRESS PUB;
48  1      DCL (SBIN,SSNX) (15) BYTE PUB;
49  1      DCL (SC,SL) (20) BYTE PUB;
50  1      DCL (REJECT,CYCLE$ERR$S,SCOUNT,SKYWAVES,RIGHTS,LEFTS,N,POWER) (5) BYTE PUB
51  1      DCL (SLVCNTX,SLVCNTY,SPHSEA,SPHSEB,SPHSEC) (5) ADDRESS PUB;
52  1      DCL SPHSED (5) STRUCTURE (DECISION (4) ADDRESS) PUB;
53  1      DCL (SPRED0,SPRED1,SPRED2) BYTE PUB;
54  1      DCL (SSN0,SSN1,SSN2) BYTE PUB;

/* TIMEOUT DECLARATIONS */
55  1      DCL (X,Y,Z) ADDRESS PUB;
56  1      DCL (MINUSIGN,HISTOLIM) BYTE PUB;

/* MAIN DECLARATIONS */
57  1      DCL PRETIME(18) BYTE PUB;
58  1      DCL PREPTR BYTE PUB;
59  1      DCL (I,J,K) BYTE PUB;
60  1      DCL MBCD (6) BYTE PUB;
61  1      DCL DUMMY ADDRESS PUB;
62  1      DCL TABLE(6) BYTE PUB;

/* EXTERNAL PROCEDURES CALLED */

63  1      BTOBCD: PROCEDURE (BINPTR, BCDPTR) ADDRESS EXTERNAL;
              /*THIS ROUTINE CALLS AN ASSEMBLY LANGUAGE PROGRAM THAT CONVERTS
                A 20 BIT NINARY NUMBER TO 6 UNPACKED BCD NUMBERS.  THIS
                SUBROUTINE USES THE DOUBLE DABBLE ALGRITHUM, I.E. SHIFT
                LEFT AND DECIMAL ADJUST 20 TIMES.  THE DATA IS PASSED IN THE
                FORM OF TABLES WITH BINPTR IN THE BC REG PAIR POINTING TO THE
                BINARY DATA AND BCDPTR IN THE DE REG PAIR POINTING TO THE
                RESULTING BCD TABLE.   */

64  2         DCL BINPTR ADDRESS, (BIN BASED BINPTR) (3) BYTE;
```

```
65  2        DCL BCDPTR ADDRESS, (BCD BASED BCDPTR) (6) BYTE;
66  2        END BTOBCD; /*END OF EXTERNAL BCD CONVERSION */

/*BCD1B.    OH 12350,8254    0 HOLT 7/21/77 */

67  1     BCDTOB: PROCEDURE (BCDPTR, BINPTR) ADDRESS EXTERNAL;
             /* THIS ROUTINE CALLS AN ASSEMBLY LANGUAGE SUBROUTINE THAT
                CONVERTS A 6 DIGIT UNPACKED BCD NUMBER TO A 3 BYTE BINARY
                NUMBER. THIS IS PREFORMED USING A METHOD SIMULAR TO
                BCD CONVERSION EXCEPT YOU SHIFT RIGHT ANDADUST THE BCD
                NUMBER BY SUBSTRACTING 3 FOR DECIMAL ADJUSTMENT. */

68  2        DCL BCDPTR ADDRESS, (BDC BASED BCDPTR) (6) BYTE;
69  2        DCL BINPTR ADDRESS, (BIN BASED BINPTR) (3) BYTE;
70  2        END BCDTOB;    /*END OF EXTERNAL BINARY CONVERSION */

71  1     SEG7: PROC EDURE(BCD) BYTE EXT;
72  2        DCL BCD BYTE;
73  2        END SEG7;

74  1     READ: PROCEDURE EXT;
75  2        END READ;

76  1     MASTER$FINE: PROCEDURE EXT;
77  2        END MASTER$FINE;

78  1     SLAVE$FINE: PROCEDURE EXT;
79  2        END SLAVEFINE;

80  1     MASTER$COARSE: PROCEDURE EXT;
81  2        END MASTER$COARSE;

82  1     SLAVE$COARSE: PROCEDURE EXT;
83  2        END SLAVE$COARSE;

84  1     SMASK: PROCEDURE (SIM) EXT;
85  2        DCL SIM BYTE;
86  2        END SMASK;
             /* INITIALIZE I/O PORTS */
87  1        OUTPUT(0E7H)=090H;
88  1        OUTPUT(0EBH)=080H;

/* INITIALIZE VARIABLES */
89  1        DO I=0 TO 5;
90  2           SEGN1(I),SEGN2(I)=0FFH;
91  2           SIGLIT(I)=0FFH;
92  2        END;

93  1        COHERENCY = 12CH;       /* 300D */
94  1        FASTSETL = 8000H - (SHL(COHERENCY, 2) + COHERENCY);
95  1        UPRLIM = 8000H + COHERENCY;
96  1        COHERENCY = 8000G - COHERENCY;

97  1        DIGIT=0;
98  1        MCOUNT,PHSPIR,MASPTR = 0;
99  1        MASCNT,INTEGRATION = 1388H;    /* 5000D */
100 1        MAXINT,INTEGRATM = 0C880H;  /* 51328D */
101 1        SIGMAM0,SIGMASA(0),SIGMASA(1),SIGMASA(2),SIGMASA(3),SIGMASA(4)=1EH;/*30D*/
102 1        SIGMAM1,SIGMASB(0),SIGMASB(1),SIGMASB(2),SIGMASB(3),SIGMASB(4)=3CH;/*60D*/
103 1        SLVCNTX(0),SLVCNTX(1),SLVCNTX(2),SLVCNTX(3),SLVCNTX(4) = INTEGRATION;
104 1        SLVCNTY(0),SLVCNTY(1),SLVCNTY(2),SLVCNTY(3),SLVCNTY(4) = MAXINT;
105 1        MBCD(0)=0;
106 1        MBCD(1)=0;
107 1        OUTPUT(OUT3) = 8EH;
108 1        MBCD(2),MBCD(3) = INPUT(IN1);
109 1        MBCD(2) = MBCD(2) AND 0FH;
```

```
110  1    MBCD(3) = ROR(MBCD(3), 4) AND 0FH;
111  1    OUTPUT(OUT3) = BFH;
112  1    MBCD(4),MBCD(5) = INPUT(IN1);
113  1    MBCD(4) = MBCD(4) AND 0FH;
114  1    MBCD(5) = ROR(MBCD(5), 4) AND 0FH;

/******    NEED PL/M-80, V3.1  */
115  1    CALL SMASK(1BH);   /* RESET RST 7.5 MASK & RESET RST 7.5 */
                             /* FOR 8085 RIM AND SIM INSTRUCTIONS  *******/
116  1    ENABLE;

117  1    DUMMY = BCDTOB(.MBCD,.MBIN0);
118  1    GRI0,MSUM0 = MBIN0;
119  1    GRI1,MSUM1 = MBIN1;
120  1    GRI2,MSUM2 = MBIN2;
121  1    MSUM3 = 0;

/* PTRMAX = GRI - 4.0MS + 955.0US + 100.0US + 819.2US */
122  1    TEMP0 = MBIN0 - 0AH;
123  1    TEMP1 = MBIN1 MINUS 53H;
124  1    TEMP2 = MBIN2 MINUS 0;
125  1    PTRMAX = ROL((TEMP1 AND 0E0H) OR TEMP2, 3);

/* INITIALIZE HISTOGRAM TABLES */
126  1    DO I=0 TO 7FH;
127  2        CFBIN(I) = 0;
128  2    END;
129  1    DO I = 0 TO 5FH;
130  2        FFBIN(I) = 0;
131  2    END;

132  1    BINCNT, NEXT, CNT, CNT3, CNT4, HISTOLIM = 0;

133  1    DIVISOR = 1;
134  1    EXP = 0;

135  1    MPHASEA,MPHASEB,MPHASEC = 8000H;
136  1    DO I = 0 TO 4;
137  2      SFOUND(I),REJECT(I),MPHASED(I),SCOUNT(I) = 0;
138  2      SKYWAVES(I),RIGHTS(I),LEFTS(I),POWER(I),N(I)= 0;
139  2      SPHSEA(I),SPHSEB(I),SPHSEC(I) = 8000H;

140  2      DO J = 0 TO 3;
141  3         SPHSED(I). DECISION(J) = 0;
142  3      END;

143  2      CYCLE$ERR$S(I),MASK(I), SORTBIN(I) = TRUE
144  2      SORT(I) = I;
145  2    END;

146  1    SWONT = 11H;
147  1    SKYWAVE,RIGHT,LEFT,MSN0,MSN1,MSN2 = 0;
148  1    CYCLE$ERR$M = TRUE;

149  1    DO I = TO 0EH;
150  2        SENX(I)
151  2    END;
152  1    MFOUND=0
153  1    ELAPTIM=0;
154  1    OUTPUT(OUT3) = (MUXCON:=0);

/* WAIT 2 SECONDS */
155  1    DO I=1 TO 125;
156  2        CALL TIME(250);   /* 25MS WITH 2MHZ CLOCK */
157  2    END
158  1    OUTPUT(OUT3) = (MUXCON:=88H);
```

```
                 /* INITIALIZE GRI DISPLAY */
159  1       DUMMY = BTOBCD(.MBIN0, NBCD1);
160  1       DO I=0 TO 5;
161  2          SEGN1(I)=SEG7(NBCD1(I));
162  2          SEGN2(I)=0;
163  2          SIGLIT(I) = 0BFH;
164  2       END;
165  1       SEGN1(0),SEGN1(1) = 0;

/* END INITIALIZATION */
166  1       DO FOREVER:
167  2          CALL READ;
168  2          IF MUX0 >1FH THEN
169  2             DO;
170  3                IF PRETIME(PREPTR) <30H THEN CALL MASTER$FINE;
172  3                ELSE CALL SLAVE$FINE;
173  3             END;  /*END OF IF MUX0, THEN*/
                  ELSE
174  2             IF ((MUX0 = MUX0 AND 0FH) > 0) AND (MUX0 < 4)
                           AND (MFOUND + 0) THEN CALL MASTER$COARSE;
176  2             ELSE CALL SLAVE$COARSE;
177  2       END;  /*END DO FOREVER*/
             /*THIS IS THE END OF THIS MADDNESS*/
178  1       END LORAN:
```

MODULE INFORMATION:

```
    CODE AREA SIZE    = 040CH     1036D
    VARIABLE AREA SIZE = 02EDH     749D
    MAXIMUM STACK SIZE = 0002H       2D
    298 LINES READ
    0 PROGRAM ERROR(S)
```

END OF PL/M-80 COMPILATION

MASTER$COARSE

ISIS-II PL/M-80 V3.0 COMPILATION OF MODULE MASTERCOARSEMODULE
OBJECT MODULE PLACED IN :F1:MASCRS.OBJ
COMPILER INVOKED BY:  PLM80  :F1:MASCRS.SRC

```
            $DATE(10 APR 78)
            $DEBUG
            $PRGEWIDTH(96)
            $TITLE('MASTER$COARSE')

/* DECLAR. JD 12780,22506    J. DELANO       04/10/78 */

1           MASTER$COARSE$MODULE:
            DO; /* BEGINNING MASTER COARSE PROGRAM MODULE */

/* LORAN C PROGRAM DECLARATIONS */

2    1      DECLARE LIT LITERALLY 'LITERALLY',
                    DCL LITERALLY 'DECLARE';
```

```
 3    1    DCL EXT LIT 'EXTERNAL',
                 PUB LIT 'PUBLIC',

/* DISPLA DECLARATIONS */
 4    1    DCL (DIGIT,DEDIG,DISP1,DISP2) BYTE EXT;
 5    1    DCL (SEGN1,SEGN2,NBCD1,NBCD2,SIGLIT) (6) BYTE EXT;
 6    1    DCL IN1 LIT '0E4H',
                 OUT1 LIT '0E8H',
                 OUT2 LIT '0E9H',
                 OUT3 LIT '0EAH',
                 OUT4 LIT '0E5H',
                 OUT5 LIT '0E6H';

/* B$BCD AND BCD$B DECLARATIONS */
 7    1    DCL (BIN0, BIN1,BIN2,BCD0,BCD1,BCD2,BCD3,BCD4,BCD5) BYTE EXT;
 8    1    DCL (BCDPTR,BINPTR) ADDRESS EXT;

/* NO GLOBAL DECLARATIONS USED SEG7 */

/* READ DECLARATIONS   */
 9    1    DCL TRUE LIT '0FFH';
10    1    DCL FOREVER LIT 'WHILE TRUE';
11    1    DCL MUXCON BYTE EXT;
12    1    DCL (MUX0,MUX1,MUX2,MUX3,MUX4,MUX5,MUX6,MUX7) BYTE EXT;

/*   MASTER$COARSE DECLARATIONS   */
13    1    DCL (MFOUND,MCOUNT,MASPTR,PHSPTR,PHASER,CORRELATE) BYTE EXT;
14    1    DCL MTIME(24) BYTE EXT;
15    1    DCL MPHASE(8) BYTE EXT;
16    1    DCL (BIN0,MBIN1,MBIN2) BYTE EXT:
17    1    DCL (TEMP0,TEMP1,TEMP2) BYTE EXT;
18    1    DCL (MREF0,MREF1,MREF2,MPRED0,MPRED1,MPRED2) BYTE EXT;
19    1    DCL ELAPTIM BYTE EXT:
20    1    DCL MPHASA LIT '1100$1010B';
21    1    DCL MPHASB LIT '1001$1111B';
22    1    DCL SPHASA LIT '1111$1001B';
23    1    DCL SPHASB LIT '1010$1100B';

/*   MASTER$FINE DECLARATIONS   */
24    1    DCL (MPHASEA,MPHASEB,MPHASEC,MASCNT) ADDRESS EXT;
25    1    DCL MPHASED (4) ADDRESS EXT;
26    1    DCL (PLSONT,SWONT,SKYWAVE,RIGHT,LEFT) BYTE EXT;
27    1    DCL (SUB0,SUB1,SUB2,TEMPA0,TEMPA1,TEMPA2) BYTE EXT;
28    1    DCL (GRI0,GRI1,GRI2,MSUM0,MSUM1,MSUM2,MSUM3,DIVISOR,EXP)BYTEEX
29    1    DCL (COHENCY,UPRLIM,FASTSETL,INTEGRATION) ADDRESS EXT;
30    1    DCL (MAXINT,INTEGRATM,SIGMAM0,SIGMAM1) ADDRESS EXT;
31    1    DCL (PRETIME0,PRETIME1,PRETIME2) BYTE EXT;
32    1    DCL (CORRECT0,CORRECT1,CORRECT2) BYTE EXT;
33    1    DCL (CYCLE$ERR$M,MSN0,MSN1,MSN2) BYTE EXT;

/* SLAVE$COARSE DECLARATIONS */
34    1    DCL (SFOUND,SORTBIN,SORT) (5) BYTE EXT;
35    1    DCL MASK (5) BYTE EXT;
36    1    DCL CFBIN (128) BYTE EXT;
37    1    DCL FFBIN (96) BYTE EXT;
38    1    DCL BINTME0,BINTME1,BINTME2) BYTE EXT;
39    1    DCL (PTR,MPTR,BINCNT,PTRMAX) BYTE EXT;
40    1    DCL (CNT,CNT3,CNT4,NEXT) BYTE EXT;

/* SLAVE$FINE DECLARATIONS */
41    1    DCL (SBIN0,SBIN1,SBIN2,SC0,SC1,S02,SC3,SL0,SL1,SL2,SL3)BYTE
               EXT;
```

```
42  1      DCL (SNUMB,PHASOUT,PHI0,PHI1) BYTE EXT;
43  1      DCL (SLVCNT,INTEGRATS,SPHASEA,SPHASEB,SPHASEC) ADDRESS EXT;
44  1      DCL (SIGMAS0,SIGMAS1) ADDRESS EXT;
45  1      DCL SPHASED (4) ADDRESS EXT;
46  1      DCL (SIGMASA,SIGMASB,LOOP$FACTOR) (5) ADDRESS EXT;
47  1      DCL (SPIN,SSNX) (15) BYTE EXT;
48  1      DCL (SC,SL) (20) BYTE EXT;
49  1      DCL (REJECT,CYCLE$ERR$S,SCOUNT,SKYWAVES,RIGHTS,LEFTS,N,
               POWER) (5) BYTE EXT;
50  1      DCL (SLVCNTX,SLVCNTY,SPHSEA,SPHSEB,SPHSEC) (5) ADDRESS EXT;
51  1      DCL SPHSED (5) STRUCTURE (DECISION (4) ADDRESS) EXT;
52  1      DCL (SPRED0,SPRED1,SPRED2) BYTE EXT;
53  1      DCL (SSN0,SSN1,SSN2) BYTE EXT;

/* TIMEOUT DECLARATIONS */
54  1      DCL (X,Y,Z) ADDRESS EXT;
55  1      DCL (MINUSIGN,HISTOLIM) BYTE EXT;

/* MAIN DECLARATIONS */
56  1      DCL PRETIME(18) BYTE EXT;
57  1      DCL PREPTR BYTE EXT;
58  1      DCL (I,J,K) BYTE EXT;
59  1      DCL MBCD (6) BYTE EXT;
60  1      DCL DUMMY ADDRESS EXT;
61  1      DCL TABLE (6) BYTE EXT;

/* EXTERNAL PROCEDURES CALLED - NONE */

/* MASCRS. WW 12350,26376    W.WURST         01/19/77 */

62  1      MASTER$COARSE: PROCEDURE PUB;

63  2      I = MASPTR;  J = PHSPTR;
65  2      MUX0 = MUX0 AND 3;
66  2      OUTPUT(OUT3)=MUXCON = 2;
67  2      MUX2 = INPUT(IN1);
68  2      OUTPUT(OUT3)=MUXCON +3;
69  2      MUX3 = INPUT(IN1);
70  2      OUTPUT(OUT3)=MUXCON + 4;
71  2      MUX4 = INPUT(IN1) AND 0FH;

72  2      OUTPUT(OUT3)=MUXCON AND 87H;
73  2      OUTPUT(OUT3)=MUXCON OR 8;

74  2      IF MCOUNT = 0 THEN 75  2          DO; /* SET MREF = PRESENT LATCHED TIME*/

76  3          MREF0=MUX2; MREF1=MUX3; MREF2=MUX4;
79  3          MPRED0 = MREF0 + MBIN0;
80  3          MPRED1 = MREF1 PLUS MBIN1;
81  3          MPRED2 = MREF2 PLUS MBIN2;

82  3          MPRED1 = MPRED1 + 2;  /*MERROR = 51. 2US*/
83  3          MPRED2 = (MPRED2 PLUS 0) AND 0FH;  /*ADD MERROR*/

84  3          PHASER = MUX0;
85  3          MCOUNT = 1;
86  3          END;   /*END OF IF MCOUNT, THEN*/
           ELSE
87  2          DO; /* COMPUTE TIME DIFFERENCE BETWEEN PREDICTION AND
                       CURRENT LATCHED TIME*/
```

```
 88  3        TEMP( = MPRED0 - MUX2;
 89  3        TEMP1 = MPRED1 MINUS MUX3;
 90  3        TEMP2 = MPRED2 MINUS MUX4;
 91  3        CORRELATE = 0;
 92  3        IF PHASER = MUX0 = 3 AND TEMP2 = 0 AND TEMP 1   4 THEN
 93             DO;  /* SET NEW REFERENCE IF PHASE CODE OF PRESENT
                     SIGNAL IS OPPOSITE ALTERNATION THAN THAT OF
                     REFERENCE AND DIFFERENCE IS WITHIN ERROR LIMITS*/

94  4        MREF0=MUX2; MREF1=MUX3; MREF2=MUX4;
 97  4        MPRED0 = MREF0 + MBIN0;
 98  4        MPRED1 = MREF1 PLUS MBIN1;
 99  4        MPRED2 = MREF2 PLUS MBIN2;
100  4        MPRED1 = MPRED1 = 2;   /*MERROR = 51. 2US*/
101  4        MPRED2 = (MPRED2 PLUS 0) AND 0FH;  /*ADD MERROR*/
102  4        PHASER = MUX0;
103  4        MCOUNT = MCOUNT + 1;
104  4        END;           /*END IF PHASER, THEN*/

ELSE
105  3        DO WHILE CORRELATE = 0;
106  4         IF MUX0 + MPHASE(J) = 3 THEN
107  4           DO;  /* COMPUTE TIME DIFFERENCE IF PHASE CODE OF
                      PRESENT SIGNAL IS OF OPPOSITE ALTERNATION THAN
                      THAT OF PAST SIGNAL */
108  5        TEMP0 = MTIME(I);
109  5        TEMP1 = MTIME(I=1);
110  5        TEMP2 = MTIME(I=2);
111  5        TEMP0 = TEMP0 - MUX2;
112  5        TEMP1 = TEMP1 MINUS MUX3;
113  5        TEMP2 = TEMP2 MINUS MUX4;
114  5        IF TEMP2 = 0 and TEMP1 <4 THEN
115  5           DO; /* SET NEW REFERENCE IF TIME DIFFERENCE IS
                      WITHIN ERROR LIMITS */
116  6        MREF0=MUX2; MREF1=MUX3; MREF2=MUX4;
119  6        MPRED0 = MREF0 + MBIN0;
120  6        MPRED1 = MREF1 PLUS MBIN1;
121  6        MPRED2 = MREF2 PLUS MBIN2;

122  6        MPRED1 = MPRED1 = 2;  /*ADD MERROR*/
123  6        MPRED2 = (MPRED2 PLUS 0) AND 0FH;
124  6        PHASER = MUX0;
125  6        MCOUNT, CORRELATE = 1;
126  6           END;         /*END OF IF TEMP2, THEN*/
127  5         END;           /*END OF IF MUX0, THEN*/
128  4        I = I + 3; J = J + 1;
130  4        IF J > 7 THEN I,J = 0;
132  4        IF J = PHSPTR AND CORRELATE = 0 THEN
133  4           DO;    /* DO ONLY IF ALL 8 PAST SIGNALS HAVE
                        BEEN CHECKED AND CORRELATION NOT ESTABLISHED*/
134  5           CORRELATE = 1;
                /*  COMPUTE TIME DIFFERENCE BETWEEN PRESENT SIGNAL
                    AND THAT OF LAST REFERENCE  /*

135  5           TEMP0 = MUX2 - MREF0;
136  5           TEMP1 = TEMP 1 MINUS MREF1;
137  5           TEMP2 = (TEMP2 MINUS MREF2) AND 0FH;

138  5           IF TEMP2 > MBIN2 OR
                      (TEMP2 = MBIN2 AND TEMP 1 > MBIN1) THEN
139  5              MCOUNT = 0; /* INDICATES THAT GRI HAS ELAPSED
                                  AND SIGNAL NOT FOUND */
140  5           IF TEMP2 < ELAPTIM THEN ELAPTIM, MCOUNT=0;
                     /*  INDICATES THAT 104MS HAVE ELAPSED
                         AND SIGNAL NOT FOUND  */
142  5           ELAPTIM=TEMP2;
```

```
143  5              END;            /*END OF IF J=, THEN*/
144  4    END;           /*END OF DO WHILE CORRELATE*/
145  3  END;             /*END OF IF MCOUNT, ELSE*/

146  2  IF MASPTR = 0 THEN
147  2      DO;
148  3         MASPTR =
149  3         PHSPTR = 8;
150  3         END;      /*END OF IF MASPTR*/
151  2  MASPTR = MASPTR - 3; PHSPTR = PHSPTR - 1;
153  2  TEMP0 = MUX2 + MBIN0;
154  2  TEMP1 = MUX3 PLUS MBIN1;
155  2  TEMP2 = MUX4 PLUS MBIN2;
156  2  TEMP1 = TEMP1 + 2;   /* ADD MERROR */
157  2  TEMP2 = (TEMP2 PLUS 0) AND 0FH;
158  2  MTIME(MASPTR) = TEMP0;
159  2  MTIME(MASPTR+1) = TEMP1;
160  2  MTIME(MASPTR+2) = TEMP2;

161  2  MPHASE(PHSPTR) = MUX0;
162  2  IF MCOUNT = 3 THEN
163  2      DO;
164  3         MFOUND = 0FFH;
165  3         SIGLIT(5) = 0FFH;
166  3         MCOUNT=0;

/* SUBTRACT 7MS + 51.2US + 30.0US + 30.0US
                + 900.0US */
             /* WHERE:   7MS = TIME FROM 1ST TO 8TH PULSE
                  900.0US = PRETIME ADVANCE
                   51.2US = MERROR
                   30.0US = POST-DETECTION INTEGRATION TIME
                   30.0US = DELAY OF 5KHZ FILTER    */
167  3         MPRED0 = MPRED0 - 0F0H;
168  3         MPRED1 = MPRED1 MINUS 38H;
169  3         MPRED2 = (MPRED2 MINUS 1) AND 0FH;

170  3         IF PHASER = 1 THEN
171  3            DO;
172  4            OUTPUT(OUT4)=MPHASB;
173  4            MPRED2=MPRED2 OR 20H;
174  4            END;

ELSE
175  3            DO;
176  4            OUTPUT(OUT4)=MPHASA;
177  4            MPRED2=MPRED2 OR 10H;
178  4            END;

179  3         OUTPUT(OUT3) = (MUXCON:=MUXCON OR 0B0H);
180  3         OUTPUT(OUT3) = (MUXCON:+MUXCON AND 8FH);
181  3         PRETIME(0) = MPRED0;
182  3         PRETIME(1) = MPRED1;
183  3         PRETIME(2) = MPRED2;
184  3         PREPTR = 2;

185  3         OUTPUT(OUT4) = PRETIME(2);
186  3         OUTPUT(OUT3) = MUXCON OR 40H;    /*LOAD MS BYTE
                     PRETIME*/
187  3         OUTPUT(OUT3) = MUXCON;
188  3         OUTPUT(OUT4) = PRETIME(1);
189  3         OUTPUT(OUT3) = MUXCON OR 20H;    /*LOAD    PRETIME*/
190  3         OUTPUT(OUT3) = MUXCON;
191  3         OUTPUT(OUT4) = PRETIME(0);
```

```
192  3         OUTPUT(OUT3) = MUXCON OR 10H;    /*LOAD LS BYTE PRETIME*/
193  3         OUTPUT(OUT3) = MUXCON :=MUXCON AND 0FH);   /*ENABLE
                   FINE LOOP*/
194  3         END;            /*END    OF IF MCOUNT = 3, THEN*/

195  2      END MASTER$COARSE;

196  1   END MASTER$COARSE$MODULE;
```

MODULE INFORMATION:

CODE AREA SIZE    + 03B1H    945D
    VARIABLE AREA SIZE = 0000H    0D
    MAXIMUM STACK SIZE = 0004H    4D
    287 LINES READ
    0 PROGRAM ERROR(S)

END OF PL/M-80 COMPILIATION
       SLAVE$COARSE

ISIS-II PL/M-80 V3.0 COMPILATION OF MODULE SLAVECOARSEMODULE
OBJECT MODULE PLACED IN :FL:SLVCRS.OBJ
COMPILER INVOKED BY:   PLM80 :F1:SLVCRS.SRC

```
          $DATE(10 APR 78)
          $DEBUG
          $PAGEWIDTH(96)
          $TITLE('SLAVE$COARSE')

/*   DECLAR.  JD[12780,22506]     J. DELANO      04/10/78  */

1         SLAVECOARSE$MODULE;
          DO;   /* SLAVE COARSE PROGRAM MODULE */

/* LORAN C PROGRAM DECLARATIONS */
2    1    DECLARE LIT LITERALLY 'LITERALLY',
                  DCL LITERALLY 'DECLARE';

3    1    DCL EXT LIT 'EXTERNAL',
              PUB LIT 'PUBLIC';

/* DISPLA DECLARATIONS */
4    1    DCL (DIGIT,DSDIG,DISP1,DISP2) BYTE EXT;
5    1    DCL (SEGN1,SEGN2,NBCD1,NBCD2,SIGLIT) (6) BYTE EXT;
6    1    DCL IN1 LIT '0E4H',
              OUT1 LIT '0E8H',
              OUT2 LIT '0E9H',
              OUT3 LIT '0EAH',
              OUT4 LIT '0E5H',
              OUT5 LIT '0E6H';

/* B$BCD AND BCD$B DECLARATIONS */
7    1    DCL (BIN0,BIN1,BIN2,BCD0,BCD1,BCD2,BCD3,BCD4,BCD5)
              BYTE EXT;
8    1    DCL (BCDPTR,BINPTR) ADDRESS EXT;

/* NO GLOBAL DECLARATIONS USED SEG7 */
```

```
                   /* READ DECLARATIONS */
 9    1    DCL TRUE LIT '0FFH';
10    1    DCL FOREVER LIT 'WHILE TRUE';
11    1    DCL MUXCON BYTE EXT;
12    1    DCL (MUX0,MUX1,MUX2,MUX3,MUX4,MUX5,MUX6,MUX7) BYTE EXT;

/* MASTER$COARSE DECLARATIONS */
13    1    DCL (MFOUND,MCOUNT,MASPTR,PHSPTR,PHASER,CORRELATE)
              BYTE EXT;
14    1    DCL MTIME(24) BYTE EXT;
15    1    DCL MPHASE(8) BYTE EXT;
16    1    DCL (MBIN0,MBIN1,MBIN2) BYTE EXT;
17    1    DCL (TEMP0,TEMP1,TEMP2) BYTE EXT;
18    1    DCL(MREF0,MREF1,MREF2,MPRED0,MPRED1,MPRED2) BYTE EXT;
19    1    DCL ELAPTIM BYTE EXT;
20    1    DCL MPHASA LIT '1100$10108';
21    1    DCL MPHASB LIT '1001$1111B';
22    1    DCL SPHASA LIT '1111$1001B';
23    1    DCL SPHASB LIT '1010$1100B';

/* MASTER$FINE DECLARATIONS */
24    1    DCL (MPHASEA,MPHASEB,MPHASEC,MASCNT) ADDRESS EXT;
25    1    DCL MPHASED (4) ADDRESS EXT;
26    1    DCL (PLSCNT,SWCNT,SKYWAVE,RIGHT,LEFT) BYTE EXT;
27    1    DCL (SUB0,SUB1,SUB2,TEMPA0,TEMPA1,TEMPA2) BYTE EXT;
28    1    DCL (GRI0, GRI1,GRI2,MSUM0,MSUM1,MSUM2,MSUM3,DIVISOR,
              EXP) BYTE EXT;
29    1    DCL (COHERENCY,UPRLIM,FASTSETL,INTEGRATION) ADDRESS EXT;
30    1    DCL (MAXINT,INTEGRATM,SIGMAM0,SIGMAM1) ADDRESS EXT;
31    1    DCL (PRETIME0,PRETIME1,PRETIME2) BYTE EXT;
32    1    DCL (CORRECT0,CORRECT1,CORRECT2) BYTE EXT;
33    1    DCL (CYCLE$ERR$M,MSN0,MSN1,MSN2) BYTE EXT;

/* SLAVE$COARSE DECLARATIONS */
34    1    DCL (SFOUND,SORTBIN, SORT) (5) BYTE EXT;
35    1    DCL MASK (5) BYTE EXT;
36    1    DCL CFBIN (128) BYTE EXT;
38    1    DCL (BINTME0, BINTME1,BINTME2) BYTE EXT;
39    1    DCL (PTR, MPTR, BINCNT, PTRMAX) BYTE EXT;
40    1    DCL (CNT,CNT3, CNT4, NEXT) BYTE EXT;

/* SLAVE$FINE DECLARATIONS */
41    1    DCL (SBIN0,SBIN1,SBIN2,SC0,SC1,SC2,SC3,SL0,SL1,SL2,SL3)
              BYTE EXT;
42    1    DCL (SNUMB,PHASOUT,PHI0,PHI1) BYTE EXT;
43    1    DCL (SLVCNT,INTEGRATS, SPHASEA, SPHASEB,SPHASEC)
              ADDRESS EXT;
44    1    DCL (SIGMAS0,SIGMAS1) ADDRESS EXT;
45    1    DCL SPHASED 94) ADDRESS EXT;
46    1    DCL (SIGMASA,SIGMASB,LOOP$FACTOR) (5) ADDRESS EXT;
47    1    DCL (SBIN,SSNX) (15) BYTE EXT;
48    1    DCL (SC,SL) (20) BYTE EXT;
49    1    DCL (REJECT,CYCLE$ERR$S,SCOUNT,SKYWAVES,RIGHTS,LEFTS,N,
              POWER) (5) BYTE EXT;
50    1    DCL (SLVCNTX,SLVCNTY,SPHSEA,SPHSEB,SPHSEC) (5) ADDRESS
              EXT;
51    1    DCL SPHSED (5) STRUCTURE (DECISION (4) ADDRESS) EXT;
52    1    DCL (SPRED0,SPRED1,SPRED2) BYTE EXT;
53    1    DCL (SSN0,SSN1,SSN2) BYTE EXT;

/* TIMEOUT DECLARATIONS */

54    1    DCL (X,Y,Z) ADDRESS EXT;
55    1    DCL (MINUSIGN,HISTOLIM) BYTE EXT;
```

```
                /* MAIN DECLARATIONS */
56    1         DCL PRETIME(18) BYTE EXT;
57    1         DCL PREPTR BYTE EXT;
58    1         DCL (I,J,K) BYTE EXT;
59    1         DCL MBCD (6) BYTE EXT;
60    1         DCL DUMMY ADDRESS EXT;
61    1         DCL TABLE (6) BYTE EXT;

/* SLVCRS. OH[12350,8254]    0 HOLT 04/10/78  */

62    1         SLAVE$COARSE: PROCEDURE PUB;

/* READ TIME COUNT */
63    2         OUTPUT(OUT3) = (MUXCON = (MUXCON AND 88H) OR 2);
64    2         BINTME0 = INPUT(IN1);
65    2         OUTPUT(OUT3) = MUXCON:= MUXCON = 1);
66    2         BINTME1 = INPUT(IN1);
67    2         OUTPUT(OUT3) = (MUXCON:= MUXCON = 1);
68    2         BINTME2 = INPUT(IN1) AND 0FH;

/* RESET TIME LATCH */
69    2         OUTPUT(OUT3) = MUXCON AND 87H;
70    2         OUTPUT(OUT3) = MUXCON OR 8;

71    2         IF ((MUX0=08 AND PHASER=20H) OR (MUX0=04 AND PHASER=10H))
                   AND (BINCNT<0FFH) AND (MFOUND = TRUE) THEN
72    2           DO;

/*CALCULATE DELAY = SLAVE TIME - MASTER REFERENCE
                       TIME*/
73    3            BINTME0 = BINTME0 - MPRED0;
74    3            BINTME1 = BINTME1 MINUS MPRED1;
75    3            BINTME2 = (BINTME2 MINUS MPRED2) AND 0FH;

/*SAVE 7 MSB FOR BIN ADDRESS   */
76    3            PTR = ROL(((BINTME1 AND 0E0H) OR BINTME2),3);
                    /* 7 MS BITS */
                                      /* GIVES RESOLUTION OF 819.2US */
                    /*CHECK FOR COARSE OR FINE HISTOGRAM*/
77    3            IF ((PTR = 1) - MASK(CNT))< 3 THEN
78    3              DO; /*ENTER POINT IN FINE HISTROGRAM */
79    4                MPTR = BINTME1 AND 7FH; /* 7 BITS: 6TH TO
                          12TH MS BITS */
                                             /* GIVES RESOLUTION
                          OF 25.6US */
80    4                IF (PTR AND 3) = 3 THEN
81    4                  DO;
82    5                    IF (MASK(CNT) AND 2) 2 THEN MPTR = MPTR
                              - 60H;
84    5                    ELSE MPTR = MPTR - 20H;
85    5                  END;
86    4                FFBIN(MPTR) = FFBIN(MPTR) = 1;
87    4                IF FFBIN(MPTR) = 8 THEN
88    4                  DO; /*CALCULATE SET UP TIME FOR SLAVE$FINE */
89    5                    DISABLE;

/*SUBTRACT 7MS = 30.0US */
90    5                    SBIN0 = BINTME0 - 0C4H;
91    5                    SBIN1 = BINTME1 MINUS 35H;
92    5                    SBIN2 = (BINTME2 MINUS 01H) AND 0FH;
93    5                    SBIN(CNT3)   = SBIN0;
94    5                    SBIN(CNT3=1) = SBIN1;
95    5                    SBIN(CNT3=2) = SBIN2;
```

```
                        /* SORT SLAVES */
96   5                  DO I = 0 TO 4;
97   6                     IF SBIN2 < SORTBIN(SORT(I)) THEN
98   6                        DO;
99   7                           J = 3;
100  7                           DO WHILE (J >= I) AND (J < 4);
101  8                              IF SFOUND(SORT(J)) THEN SORT(J+1) =
                                       SORT(J);
103  8                              J = J - 1;
104  8                           END;
105  7                           SORT(I) = CNT;
106  7                           I = 4;
107  7                        END;     /* END OF IF SBIN2, THEN */
108  6                     END;   /* END OF DO I */
                        /* END OF SLAVE SORT */
109  5                  SFOUND(CNT),SIGLIT(CNT) = 0FFH;
110  5                  SORTBIN(CNT) = SBIN2;

111  5                  IF CNT < 4 THEN CNT = CNT = 1;
113  5                  ELSE CNT = 0;
114  5                  I = 0;

115  5                  DO WHILE (SFOUND(CNT) = TRUE) AND (I < 5);
116  6                     IF CNT < 4 THEN CNT = CNT + 1;
118  6                     ELSE CNT = 0;
119  6                     I = I + 1;
120  6                  END;

121  5                  IF I = 5 THEN BINCNT = 0FFH;  /* SLAVE COARSE
                           FINISHED */
123  5                  ELSE CNT4 = (CNT3:= CNT + CNT + CNT) + CNT;
                        /* CNT3 = 3*CNT */
                        /* CNT4 = 4*CNT */

/*CLEAR FINE HISTOGRAM TABLE */
124  5                  DO I = 0 TO 5FH;
125  6                     FFBIN(I) = 0;
126  6                  END;  /*END CLEAR FINE HISTOGRAM TABLE */

127  5               END;  /* CALCULATE SLAVE FINE */
128  4            ENABLE;
129  4         END;  /* END FINE HISTOGRAM */

ELSE
130  3           DO;  /*INCREMENT COARSE TABLE */
131  4              IF BINCNT < 0FH THEN
132  4                 DO;
133  5                    CFBIN(PTR) = CFBIN(PTR) + 1;
134  5                    IF CFBIN(PTR) = 7BH THEN     /* 123D */
135  5                       DO;  /*CHECK MASKS SEE IF SLAVE HAS BEEN
                                 FOUND YET; IF NOT,
                                 SET MASK FOR SLAVE FINE */
136  6                          DISABLE;
137  6                          TEMP0 = PTR + 0CH;  /* TEMP0 = PTR + 12D */
138  6                          IF (TEMP0 - MASK(0)) > 18H THEN
139  6                             DO;
140  7                                IF (TEMP0 - MASK(1)) > 18H THEN
141  7                                   DO;
142  8                                      IF (TEMP0 - MASK(2)) > 18H THEN
143  8                                         DO;
144  9                                            IF (TEMP0 - MASK(3)) > 18H THEN
145  9                                               DO;
146  10                                                 IF (TEMP0 - MASK(4)) > 18H THEN
147  10                                                    DO;
148  11                                                       IF PTR > 16H THEN
149  11                                                          DO;
150  12                                                             IF PIR < PTRMAX THEN
```

```
151  12                            DO;    /* FORM ANOTHER
                                       MASK */
152  13                            MASK(NEXT) = PTR;
153  13                            IF NEXT < 4 THEN NEXT =
                                       NEXT + 1;
155  13                            ELSE NEXT = 0;
156  13                            I = 0;

157  13                            DO WHILE (MASK(NEXT)
                                       < 0FFH) AND (I < 5);
158  14                              IF NEXT < 4 THEN NEXT =
                                       NEXT + 1;
160  14                              ELSE NEXT = 0;
161  14                              I = I + 1;
162  14                            END;

163  13                            IF I = 5 THEN BINCNT =
                                       3FH; /* COARSE HISTOGRAM
                                              COMPLETE 8/
165  13                          END;    /* END OF FORM
                                              ANOTHER MASK */
166  12                         END;
167  11                        END;
168  10                       END;
169   9                      END;
170   8                     END;
171   7                   END;
172   6                   ENABLE,
173   6                 END;    /* END OF IF CFBIN(PTR), THEN */
174   5               END;    /* END OF IF BINCNT, THEN */
175   4             END;    /* END OF COARSE HISTOGRAM */
176   3         END;    /* END OF INITIAL IF STATEMENT */
177   2     RETURN;
178   2     END SLAVE$COARSE;

179   1   END SLAVECOARSE$MODULE;

MODULE INFORMATION:

CODE AREA SIZE     = 0375H    885D
     VARIABLE AREA SIZE = 0000H      0D
     MAXIMUM STACK SIZE = 0004H      4D
     265 LINES READ
     0 PROGRAM ERROR(S)

END OF PL/M-80 COMPILATION
          SLAVE$FINE

ISIS-II PL/M-80 V3.0 COMPILATION OF MODULE SLAVEFINEMODULE
OBJECT MODULE PLACED IN :F1:SLVFIN.OBJ
COMPILER INVOKED BY; PLM80 :F1:SLVFIN.SRC $DATE(21 APR 78)
          $DEBUG
          $PAGEWIDTH(96)
          $TITLE('SLAVE$FINE')

/* DECLAR.JD[12780,22506]    J. DELANO    04/21/78 */

1         SLAVEFINE$MODULE:
          DO; /* BEGINNING SLAVE FINE PROGRAM MODULE */

/* LORAN C PROGRAM DECLARATIONS */
```

| | | |
|---|---|---|
| 2 | 1 | DECLARE LIT LITERALLY 'LITERALLY', <br> DCL LITERALLY 'DECLARE'; |
| 3 | 1 | DCL EXT LIT 'EXTERNAL', <br> PUB LIT 'PUBLIC'; |

/* DISPLA DECLARATIONS */

| | | |
|---|---|---|
| 4 | 1 | DCL (DIGIT,DSDIG,DISP1,DISP2) BYTE EXT; |
| 5 | 1 | DCL (SEGN1,SEGN2,NBCD1,NBCD2,SIGLIT) (6) BYTE EXT; |
| 6 | 1 | DCL IN1 LIT '0E4H', <br> OUT1 LIT '0E8H', <br> OUT2 LIT '0E9H', <br> OUT3 LIT '0EAH', <br> OUT4 LIT '0E5H', <br> OUT5 LIT '0E6H'; |

/* B$BCD AND BCD$B DECLARATIONS */

| | | |
|---|---|---|
| 7 | 1 | DCL (BIN0,BIN1,BIN2,BCD0,BCD1,BCD2,BCD3,BCD4,BCD5) <br> BYTE EXT; |
| 8 | 1 | DCL (BINPTR,BCDPTR) ADDRESS EXT; |

/* NO GLOBAL DECLARATIONS USED SEG7 */

/* READ DECLARATIONS */

| | | |
|---|---|---|
| 9 | 1 | DCL TRUE LIT '0FFH'; |
| 10 | 1 | DCL FOREVER LIT 'WHILE TRUE'; |
| 12 | 1 | DCL MUXCON BYTE EXT; |

/* MASTER$COARSE DECLARATIONS */

| | | |
|---|---|---|
| 13 | 1 | DCL (MFOUND,MCOUNT,MASPTR,PHSPTR,PHASER,CORRELATE) <br> BYTE EXT; |
| 14 | 1 | DCL MTIME(24) BYTE EXT; |
| 15 | 1 | DCL MPHASE(8) BYTE EXT; |
| 16 | 1 | DCL (MBIN0,MBIN1,MBIN2) BYTE EXT; |
| 17 | 1 | DCL (TEMP0,TEMP1,TEMP2) BYTE EXT; |
| 18 | 1 | DCL (MREF0,MREF1,MREF2,MPRED0,MPRED1,MPRED2) BYTE EXT; |
| 19 | 1 | DCL ELAPTIM BYTE EXT: |
| 20 | 1 | DCL MPHASA LIT '1100$1010B'; |
| 21 | 1 | DCL MPHASB LIT '1001$1111B'; |
| 22 | 1 | DCL SPHASA LIT '1111$1001B'; |
| 23 | 1 | DCL SPHASB LIT '1010$1100B'; |

/* MASTER$FINE DECLARATIONS */

| | | |
|---|---|---|
| 24 | 1 | DCL (MPHASEA,MPHASEB,MPHASEC,MASCNT) ADDRESS EXT; |
| 25 | 1 | DCL MPHASED (4) ADDRESS EXT; |
| 26 | 1 | DCL (PLSCNT,SWCNT,SKYWAVE,RIGHT,LEFT) BYTE EXT; |
| 27 | 1 | DCL (SUB0,SUB1,SUB2,TEMPA0,TEMPA1,TEMPA2) BYTE EXT; |
| 28 | 1 | DCL (GRI0,GRI1,GRI2,MSUM0,MSUM1,MSUM2,MSUM3) BYTE EXT; |
| 29 | 1 | DCL (COHERENCY,UPRLIM,FASTSETL,INTEGRATION) ADDRESS EXT; |
| 30 | 1 | DCL (MAXINT,INTEGRATM,SIGMAM0,SIGMAM1) ADDRESS EXT; |
| 31 | 1 | DCL (PRETIME0,PRETIME1,PRETIME2) BYTE EXT; |
| 32 | 1 | DCL (CORRECT0,CORRECT1,CORRECT2) BYTE EXT; |
| 33 | 1 | DCL (CYCLE$ERR$M,MEN0,MSN1,MSN2) BYTE EXT; |
| 34 | 1 | DCL PHASED$STORE (4) ADDRESS EXT; |

/*SLAVE$COARSE DECLARATIONS */

| | | |
|---|---|---|
| 35 | 1 | DCL (SFOUND,SORTBIN,SORT) (5) BYTE EXT; |
| 36 | 1 | DCL MASK (5) BYTE EXT; |
| 37 | 1 | DCL CFBIN (128) BYTE EXT; |
| 38 | 1 | DCL FFBIN (96) BYTE EXT; |
| 39 | 1 | DCL (BINTME0,BINTME1,BINTME2) BYTE EXT; |
| 40 | 1 | DCL (PTR,MPTR,BINCNT,PTRMAX) BYTE EXT; |
| 41 | 1 | DCL (CNT,CNT3,CNT4,NEXT) BYTE EXT; |

/* SLAVE$FINE DECLARATIONS */

| | | |
|---|---|---|
| 42 | 1 | DCL (SBIN0,SBIN1,SBIN2,SC0,SC1,SC2,SC3,SL0,SL1,SL2,SL3) <br> BYTE EXT; |

```
43  1       DCL (SNUMB,PHASOUT,PHI0,PHI1) BYTE EXT;
44  1       DCL (SLVCNT,INTEGRATS,SPHASEA,SPHASEB,SPHASEC)
                ADDRESS EXT;
45  1       DCL (SIGMAS0,SIGMAS1) ADDRESS EXT;
46  1       DCL SPHASED (4) ADDRESS EXT;
47  1       DCL (SIGMASA,SIGMASB,LOOP$FACTOR) (5) ADDRESS EXT.
48  1       DCL (SBIN,SSNX) (15) BYTE EXT;
49  1       DCL (SC,SL) (20) BYTE EXT;
50  1       DCL (REJECT,CYCLE$ERR$S,SCOUNT,SKYWAVES,RIGHTS,LEFTS,N,
                POWER) (5) BYTE EXT;
51  1       DCL (SLVCNTX,SLVCNTY,SPHSEA,SPHSEB,SPHSEC) (5) ADDRESS EXT;
52  1       DCL SPHSED (5) STRUCTURE (DECISION (4) ADDRESS) EXT;
53  1       DCL (SPRED0,SPRED1,SPRED2) BYTE EXT;
54  1       DCL (SSN0,SSN1,SSN2) BYTE EXT;

/* TIMEOUT DECLARATIONS */
55  1       DCL (X,Y,Z) ADDRESS EXT;
56  1       DCL (MINUSIGN,HISTOLIM) BYTE EXT;

/* MAIN DECLARATIONS */
57  1       DCL PRETIME (18) BYTE EXT
58  1       DCL PREPIR BYTE EXT;
59  1       DCL (I,J,K) BYTE EXT
60  1       DCL MBCD (6) BYTE EXT;
61  1       DCL DUMMY ADDRESS EXT;
62  1    DCL TABLE (6) BYTE EXT;

/* EXTERNAL PROCEDURE CALLS - NONE */

/* SLVFIN. WW 12350,26376    W. WURST      04/21/78 */

63  1    SLAVE$FINE: PROCEDURE PUB;

/* INITIALIZE SLAVE VARIABLES */
64  2       SNUMB = SHR(PRETIME(PREPTR) - 40H, 5);
65  2       SPRED2 = PRETIME(PREPTR) AND 0FH;
66  2       SPRED1 = PRETIME(PREPTR:=PREPTR - 1);
67  2       SPRED0 - PRETIME(PREPTR: = PREPTR - 1);

68  2       PREPTR = PREPTR + 5;
69  2       J = (K:=SHL(SNUMB, 2)) - SNUMB;  /*K=4*SNUMB, J = 3*SNUMB*/

70  2       SBIN0 = SBIN(J);
71  2       SBIN1 = SBIN(J+1);
72  2       SBIN2 = SBIN(J+2);

73  2       SC0 = SC(K);
74  2       SL0 = SL(K);
75  2       SC1 = SC(K:=K+1);
76  2       SL1 = SL(K);
77  2       SC2 = SC(K:=K+1);
78  2       SL2 = SL(K);
79  2       SC3 = SC(K:= K+1);
80  2       SL3 = SL(K);

81  2       SPHASEA = SPHSER(SNUMB);SPHSEA(SNUMB);
82  2       SPHASEB = SPHSEB(SNUMB);
83  2       SPHASEC = SPHSEC(SNUMB);
84  2       SPHASED(0) = SPHSED(SNUMB).DECISION(0);
85  2       SPHASED(1) = SPHSED(SNUMB).DECISION(1);
86  2       SPHASED(2) = SPHSED(SNUMB).DECISION(2);
87  2       SPHASED(3) = SPHSED(SNUMB).DECISION(3);
88  2       SIGMAS0 = SIGMASA(SNUMB);
89  2       SIGMAS1 = SIGMASB(SNUMB);
90  2       SLVCNT = SLVCNTX(SNUMB);
91  2       INTEGRATS = SLVCNTY(SNUMB);
```

```
                /*INITIALIZE SUB = 251DH (950.1US)*/
 92  2          SUB0 = 1DH;
 93  2          SUB1 = 25H;
 94  2          SUB2, TEMPA0, TEMPA1, TEMPA2,PLSCNT = 0;

/*READ PULSECOUNT*/
 95  2          OUTPUT(OUT3) = (MUXCON:=(MUXCON AND 8) OR 1) + 3;
 96  2          MUX4 = INPUT(IN1);

97  2          IF MUX4 < 20H THEN
 98  2          DO;

99  3            DO WHILE PLSCNT < 80H;
100  4               OUTPUT(OUT3) = (MUXCON:= MUXCON + 3);
101  4               MUX4 = INPUT(IN1);
102  4               DO WHILE PLSCNT - (MUX4 AND 0F0H);
103  5                  MUX4 = INPUT(IN1);
104  5               END:  /* END OF DO WHILE PLSCNT = MUX4 */
105  4               PLSCNT = PLSCNT + 10H;

/* READ MULTIPLEXER */
106  4               MUX4 = MUX4 AND 0FH;

107  4               OUTPUT(OUT3) = (MUXCON:= MUXCON - 1);
108  4               MUX3 = INPUT(IN1);

109  4               OUTPUT(OUT3) = (MUXCON:= MUXCON - 1);
110  4               MUX2 = INPUT(1N1);

111  4               OUTPUT(OUT3) = (MUXCON:= MUXCON - 1);

112  4               IF (MUX1:= INPUT(IN1)) THEN SPHASEA = SPHASEA + 1;
114  4               ELSE SPHASEA = SPHASEA - 1;

115  4               IF (MUX1:= ROR(MUX1,1)) THEN SPHASEB = SPHASEB + 1;
117  4               ELSE SPHASEB = SPHASEB - 1;

118  4               IF (MUX1:= ROR(MUX1,1)) THEN SPHASEC = SPHASEC + 1;
120  4               ELSE SPHASEC = SPHASEC - 1;

121  4               I = (MUX1:= ROR(MUX1,1)) AND 3;
122  4               SPHASED(I) = SPHASED(I) + 1;

/*COMPUTE DIFFERENCE BETWEEN LATCHED TIME AND PRETIME*/
123  4               TEMP0 = MUX2 - SPRED0;
124  4               TEMP1 = MUX3 MINUS SPRED1;
125  4               TEMP2 = MUX4 MINUX SPRED2;

/*SUBTRACT MULTIPLE OF 1000.0US*/
126  4               TEMP0 = TEMP0 - SUB0;   /*0.0US <= TEMP <= 9.8US */
127  4               TEMP1 = TEMP1 MINUS SUB1;
128  4               TEMP2 = TEMP2 MINUX SUB2;

/* WILD NUMBER CATCHER */
129  4               IF ((TEMP2 OR TEMP1)<> 0) OR (TEMP0 > 62H) THEN TEMP0 = 31H:

131  4               TEMPA0 = TEMPA0 + TEMP0;
132  4               TEMPA1 = TEMPA1 PLUS 0;

/*ADD 1000.0US TO SUBTRAHEND*/

133  4               SUB0 = SUB0 + 10H;
134  4               SUB1 = SUB1 PLUS 27H;
135  4               SUB2 = SUB2 PLUS 0;

136  4            END:    /*END OF DO WHILE PLSCNT < 80H*/
```

```
            /*ROUND-OFF TEMPA*/
137  3          TEMPA0 = TEMPA0 + 4;
138  3          TEMPA1 = TEMPA1 PLUS 0;
            /*DIVIDE TEMPA BY 8*/
139  3          TEMPA1 = SHR(TEMPA1,1);
140  3          TEMPA0 = SCR(TEMPA0,1);
141  3          TEMPA1 = SHR(TEMPA1,1);
142  3          TEMPA0 = SCR(TEMPA0,1);
143  3          TEMPA0 = SHR(TEMPA0,1);
            /*SUBTRACT 4.9US*/
144  3          PHI0 = TEMPA0 - 31H;
145  3          PHI1 = TEMPA1 MINUS 0;

146  3          SLVCNT = SLVCNT - 8;
147  3          INTEGRATS = INTEGRATS - 8;
148  3          CORRECT0,CORRECT1,CORRECT2 = 0;

/*OUTPUT PHASE CODE*/
149  3          IF (PHASOUT:= PRETIME(PREPTR) AND 0F0H) < 30H THEN
150  3          DO;
151  4             IF PHASOUT = 10H THEN OUTPUT(OUT4) = MPHASA;
153  4             ELSE OUTPUT(OUT4) = MPHASB;
154  4          END;
            ELSE
155  3          DO;
156  4             IF (PHASOUT AND 10H)   0 THEN OUTPUT(OUT4) = SPHASB;
158  4             ELSE OUTPUT(OUT4) = SPHASA;
159  4          END;   /* END OF IF PHASOUT < 30H, ELSE */

160  3          OUTPUT(OUT3) = 8;
161  3          MUX0 = INPUT(IN1) AND 3FH;

162  3          DO WHILE MUX0 > 1FH;         /*WAIT */
163  4             MUX0 = INPUT(IN1) AND 3FH;
164  4          END;   /* END OF DO WHILE */

/*LOAD PHASE CODE*/
165  3          DISABLE;
166  3          OUTPUT(OUT3) = (MUXCON:= MUXCON OR 0B0H);  /*DISABLE FINE
                   LOOP */
167  3          OUTPUT(OUT3) = MUXCON:= MUXCON AND 8FH);

/*LOAD PRETIME*/
168  3          OUTPUT(OUT4) = PRETIME(PREPTR - 2);
169  3          OUTPUT(OUT3) = MUXCON OR 10H;
170  3          OUTPUT(OUT3) = MUXCON;

171  3          OUTPUT(OUT4) = PRETIME(PREPTR - 1);
172  3          OUTPUT(OUT3) = MUXCON OR 20H;
173  3          OUTPUT(OUT3) = MUXCON;

174  3          OUTPUT(OUT4) = PRETIME(PREPTR);
175  3          OUTPUT(OUT3) = MUXCON OR 40H;
176  3          OUTPUT(OUT3) = (MUXCON:= MUXCON AND 0FH);  /*ENABLE FINE
                   LOOP */
177  3          ENABLE;

/*TEST FOR EARLY GROUND WAVE*/
178  3       TEMP0 = TRUE;
179  3       IF SPHASEA > COHERENCY THEN
180  3         DO;
181  4          IF SPHASEB > COHERENCY THEN
182  4            DO;
183  5             IF SPHASEC > COHERENCY THEN
184  5               DO;
185  6                IF SPHASEC < UPRLIM THEN
186  6                  DO;
```

```
187  7                   IF SPHASEB < UPRLIM THEN
188  7                     DO;
189  8                       IF SPHASEA < UPRLIM THEN TEMP0 = 0;
191  8                     END;
192  7                   END;
193  6                 END;
194  5               END;
195  4             END;
196  3           IF TEMP0 THEN
197  3             DO;
198  4               IF (I:=SKYWAVES(SNUMB)) < 4 THEN I = 0;
200  4               ELSE I = I - 3;
201  4               IF I > 3 THEN I = 3;

203  4               CORRECT2 = 0FFH;

204  4               DO CASE I;
205  5                 DO;      /* CASE 0 */
                               /*CORRECT = -40.0US */
206  6                   CORRECT0 = 70H;   CORRECT1 = 0FEH;
208  6                 END;

209  5                 DO;    /* CASE 1 */
                              /* CORRECT = -50.0US */
210  6                   CORRECT0 = 0CH;   CORRECT1 = 0FEH;
212  6                 END;

213  5                 DO;    /* CASE 2 */
                              /* CORRECT = -60.0US */
214  6                   CORRECT0 = 0A8H;   CORRECT1 = 0FDH;
216  6                 END;

217  5                 DO;    /* CASE 3 */
                              /* CORRECT = -70.0US */
218  6                   CORRECT0 = 44H;   CORRECT1 = 0FDH;
220  6                 END;
221  5               END;    /* END OF DO CASE */

222  4               CYCLE$ERR$S(SNUMB) = TRUE;
223  4               SPHASEA,SPHASEB,SPHASEC = 0000H;
224  4               SLVCNT = INTEGRATION;
225  4               SSNX(J),SCOUNT(SNUMB),SKYWAVES(SNUMB),LEFTS(SNUMB),RIGHTS
                       (SNUMB),N(SNUMB),SPHASED(0),SPHASED(1),SPHASED(2),
                       SPHASED(3) = 0;
226  4               INTEGRATS = MAXINT;
227  4             END;

228  3           IF SLVCNT < 8 THEN
229  3             DO;
230  4               SPHASEA,SPHASEB,SPHASEC = 8000H;
231  4               SLVCNT = INTEGRATION;
232  4             END;

233  3           IF SPHASED(0) > SPHASED(3) THEN
234  3             DO;
235  4               X = SPHASED(3);
236  4               Y = SPHASED(0);
237  4             END;
                   ELSE
238  3             DO;
239  4               X = SPHASED(0);
240  4               Y = SPHASED(3);
241  4             END;

/*TEST FOR NO CORRECTION DECISION*/
242  3           IF (X + SIGMAS0) > Y THEN   /*LEFT/RIGHT DECISION BALANCED */
243  3             DO;
```

```
244  4            IF SPHASED(1) > (SPHASED(2) + SIGMAS0 + SIGMAS1) THEN
245  4              DO;
246  5                SSNX(J) = HIGH(INTEGRATS);
247  5                INTEGRATS = MAXINT;
248  5                CYCLE$ERR$S(SNUMB),LEFTS(SNUMB),RIGHTS(SNUMB),
                        SPHASED(0),SPHASED(1),SPHASED(2),SPHASED(3) = 0;
249  5                SCOUNT(SNUMB) = 0FDH;    /* -3 */
250  5              END;
251  4          END;
             ELSE
252  3          DO;   /*TEST FOR CORRECT LEFT/RIGHT DECISION*/
253  4            IF SPHASED(3) > SPHASED(0) + SIGMAS1 THEN
254  4              DO;

255  5                      PHASED$STORE(0) = SPHASED(0);
256  5                      PHASED$STORE(1) = SPHASED(1);
257  5                      PHASED$STORE(2) = SPHASED(2);
258  5                      PHASED$STORE(3) = SPHASED(3);

259  5                SPHASED(0),SPHASED(1),SPHASED(2),SPHASED(3) = 0;
260  5                INTEGRATS = MAXINT;
261  5                IF (SCOUNT(SNUMB):= SCOUNT(SNUMB) + 1) = 1 THEN
262  5                  DO;   /* CORRECT RIGHT */
                          /*CORRECT = +10.0US */
263  6                    CORRECT0 = 64H;

264  6                    SKYWAVES(SNUMB) = SKYWAVES(SNUMB) + 1;
265  6                    CYCLE$ERR$S(SNUMB) = TRUE;
266  6                    SSNX(J),SCOUNT(SNUMB),LEFTS(SNUMB),N(SNUMB) = 0;

267  6                    IF (RIGHTS(SNUMB):= RIGHTS(SNUMB) + 1) > 1 THEN
268  6                      DO;
269  7                        SPHASEA,SPHASEB,SPHASEC = 8000H;
270  7                        SLVCNT = INTEGRATION;
271  7                      END;
272  6                  END;    /* END OF CORRECT RIGHT */
273  5              END;   /* END OF CORRECT RIGHT DECISION */
             ELSE
274  4          DO;   /*TEST FOR CORRECT LEFT DECISION*/
275  5            IF SPHASED(0) > SPHASED(3) + SIGMAS1 THEN
276  5              DO;

277  6                      PHASED$STORE(0) = SPHASED(0);
278  6                      PHASED$STORE(1) = SPHASED(1);
279  6                      PHASED$STORE(2) = SPHASED(2);
280  6                      PHASED$STORE(3) = SPHASED(3);

281  6                SPHASED(0),SPHASED(1),SPHASED(2),SPHASED(3) = 0;
282  6                INTEGRATS = MAXINT;
283  6                IF (SCOUNT(SNUMB):= SCOUNT(SNUMB) + 1) = 1 THEN
284  6                  DO;   /* CORRECT LEFT */
                          /* CORRECT = -10.0US */
285  7                    CORRECT0 = 9CH;    CORRECT1,CORRECT2 = 0FFH;

287  7                    IF SKYWAVES(SNUMB) > 0 THEN SKYWAVES(SNUMB) =
                              SKYWAVES(SNUMB)
                              - - 1;
289  7                    CYCLE$ERR$S(SNUMB) = TRUE;
290  7                    SSNX(J),SCOUNT(SNUMB),RIGHTS(SNUMB),N(SNUMB)= 0;

291  7                    IF (LEFTS(SNUMB):=LEFTS(SNUMB) + 1) > 1 THEN
292  7                      DO;
293  8                        SPHASEA,SPHASEB,SPHASEC = 8000H;
294  8                        SLVCNT = INTEGRATION;
295  8                      END;
296  7                  END    /* END OF CORRECT LEFT */
297  6              END;   /* END OF CORRECT LEFT DECISION */
```

```
298  5            END;   /*END OF TEST FOR CORRECT LEFT DECISION*/
299  4         END;  /*END OF TEST FOR CORRECT LEFT/RIGHT DECISION*/

300  3         IF (I:= N(SNUMB)) < 0AH THEN
301  3           DO;
302  4             IF I < 3 THEN
303  4               DO CASE I;

304  5                 DO;   /* CASE 0 */
305  6                   SBIN0 = SBIN0 + PHI0;
306  6                   SBIN1 = SBIN1 PLUS PHI1;
307  6                   SBIN2 = SBIN2 PLUS PHI1;

308  6                   SBIN0 = SBIN0 + CORRECT0;
309  6                   SBIN1 = SBIN1 PLUS CORRECT1;
310  6                   SBIN2 = SBIN2 PLUS CORRECT2;

311  6                   SC0 = SBIN0 + SBIN0;
312  6                   SC1 = SBIN1 PLUS SBIN1;
313  6                   SC2 = SBIN2 PLUS SBIN2;
314  6                   SC3 = 0;

315  6                   IF POWER(SNUMB) = 1 THEN N(SNUMB) = 1;
317  6                   LOOP$FACTOR(SNUMB) = 2;   POWER(SNUMB) = 1;
319  6                 END;   /* END CASE 0 */

320  5                 DO;   /* CASE 1 */
321  6                   SC0 = SC0 + PHI0;
322  6                   SC1 = SC1 PLUS PHI1;
323  6                   SC2 = SC2 PLUS PHI1;
                        /* SC3 = 0 */

324  6                   SBIN0 = SC0 + SHR(LOW(LOOP$FACTOR(SNUMB)), 1);
325  6                   SBIN1 = SC1 PLUS 0;
326  6                   SBIN2 = SC2 PLUS 0;   /* ROUND-OFF */

327  6                   SBIN2 = SHR(SBIN2, 1);
328  6                   SBIN1 = SCR(SBIN1, 1);
329  6                   SBIN0 = SCR(SBIN0, 1);

330  6                   SC0 = SC0 + SC0;   /* SC = 4*SBIN */
331  6                   SC1 = SC1 PLUS SC1;
332  6                   SC2 = SC2 PLUS SC2;

333  6                   LOOP$FACTOR(SNUMB) = 4;   POWER(SNUMB),N(SNUMB) = 2;
335  6                 END;   /* END CASE 1 */

336  5                 DO;   /* CASE 2 */
337  6                   PHI0 = PHI0 + SHR(LOW(LOOP$FACTOR(SNUMB)), 2);
338  6                   PHI1 = PHI1 PLUS 0;

339  6                   PHI1 = ROR(PHI1, 1);
340  6                   PHI0 + SCR(PHI0, 1);

341  6                   SC0 = SC0 + PHI0;
342  6                   SC1 = SC1 PLUS PHI1;
343  6                   SC2 = SC2 PLUS PHI1;
                        /* SC3 = 0 */

344  6                   SBIN0 = SC0 + 2;
345  6                   SBIN1 = SC1 PLUS 0;
346  6                   SBIN2 = SC2 PLUS 0;

347  6                   DO I = 0 to 1;
348  7                     SBIN2 = SHR(SBIN2, 1);
349  7                     SBIN1 = SCR(SBIN1, 1);
```

```
350  7              SBIN0 = SCR(SBIN0, 1);
351  7           END:   /* END OF DIVIDE BY 4 */

352  6           SL0,SL1,SL2,SL3 = 0;    N(SNUMB) = 3;
354  6        END;   /*END CASE 2 */
355  5     END;   /* END OF DO CASE N */
           ELSE
356  4     DO;   /* IF 2 < N <10 */
357  5        SL0 = SL0 + PHI0;
358  5        SL1 = SL1 PLUS PHI1;
359  5        SL2 = SL2 PLUS PHI1;
360  5        SL3 = SL3 PLUS PHI1;

361  5        TEMPA0 = SL0 + SHR(LOOP$FACTOR(SNUMB), 1);
362  5        TEMPA1 = SL1 PLUS 0;
363  5        TEMPA2 = SL2 PLUS 0;
364  5        TEMP2 = SL3 PLUS 0;

365  5        DO I = 0 TO POWER(SNUMB)-1;
366  6           TEMP2 = ROR(TEMP2, 1);   /* TEMP2,SL3 ALWAYS 0 OR 0FFH */
367  6           TEMPA2 = SCR(TEMPA2, 1);
368  6              TEMPA1 = SCR(TEMPA1, 1);
369  6              TEMPA0 = SCR(TEMPA0, 1);
370  6           END;   /* END OF DIVIDE BY 2**POWER */

371  5           SC0 = SC0 + TEMPA0;
372  5           SC1 = SC1 PLUS TEMPA1;
373  5           SC2 = SC2 PLUS TEMPA2;
374  5           SC3 = SC3 PLUS TEMP2;

375  5           TEMPA0 = SL0 + SL0;
376  5           TEMPA1 = SL1 PLUS SL1;
377  5           TEMPA2 = SL2 PLUS SL2;
378  5           TEMP2 = SL3 PLUS SL3;

379  5           SBIN0 = SC0 + TEMPA0;
380  5           SBIN1 = SC1 PLUS TEMPA1;
381  5           SBIN2 = SC2 PLUS TEMPA2;
382  5           TEMP2 = SC3 PLUS TEMP2;

383  5           SBIN0 = SBIN0 + SHR(LOOP$FACTOR(SNUMB), 1);
384  5           SBIN1 = SBIN1 PLUS 0;
385  5           SBIN2 = SBIN2 PLUS 0;
386  5           TEMP2 = TEMP2 PLUS 0;

387  5           DO I = 0 TO POWER(SNUMB)-1;
388  6              TEMP2 = SHR(TEMP2, 1);
389  6              SBIN2 = SCR(SBIN2, 1);
390  6              SBIN1 = SCR(SBIN1, 1);
391  6              SBIN0 = SCR(SBIN0, 1);
392  6           END;   /* END OF DIVIDE BY 2**POWER */

393  5           SL0 = SL0 + SL0;
394  5           SL1 = SL1 PLUS SL1;
395  5           SL2 = SL2 PLUS SL2;
396  5           SL3 = SL3 PLUS SL3;

397  5           SC0 = SC0 + SC0;
398  5           SC1 = SC1 PLUS SC1;
399  5           SC2 = SC2 PLUS SC2;
400  5           SC3 = SC3 PLUS SC3;

401  5           LOOP$FACTOR(SNUMB) = LOOP$FACTOR(SNUMB) +
                    LOOP$FACTOR(SNUMB);
402  5           POWER(SNUMB) = POWER(SNUMB) + 1;   N(SNUMB) =
                    N(SNUMB) + 1;
```

```
404  5              END;    /* END OF IF N < 3, ELSE */
405  4           END;       /* END OF IF N < 10, THEN */
                ELSE
406  3           DO;    /* IF N > 9 */
407  4              SL0 = SL0 + PHI0;
408  4              SL1 = SL1 PLUS PHI1;
409  4              SL2 = SL2 PLUS PHI1;
410  4              SL3 = SL3 PLUS PHI1;

411  4              TEMPA0 = SL1 + SHR(HIGH(LOOP$FACTOR(SNUMB)), 1);
412  4              TEMPA1 = SL2 PLUS 0;
413  4              TEMPA2 = SL3 PLUS 0;

414  4              TEMPA2 = ROR(TEMPA2, 1);   /* TEMPA2,SL3 ALWAYS 0 OR
                       0FFH */
415  4              TEMPA1 = SCR(TEMPA1, 1);
416  4              TEMPA0 = SCR(TEMPA0, 1);

417  4              SC0 = SC0 + TEMPA0;
418  4              SC1 = SC1 PLUS TEMPA1;
419  4              SC2 = SC2 PLUS TEMPA2;
420  4              SC3 = SC3 PLUS TEMPA2;

421  4              TEMPA0 = SL0 + SL0;
422  4              TEMPA1 = SL1 PLUS SL1;
423  4              TEMPA2 = SL2 PLUS SL2;
424  4              TEMP2 = SL3 PLUS SL3;

425  4              TEMPA0 = SC0 + TEMPA0;
426  4              SBIN0 = SC1 PLUS TEMPA1;
427  4              SBIN1 = SC2 PLUS TEMPA2;
428  4              SBIN2 = SC3 PLUS TEMP2;

429  4              SBIN0 = SBIN0 + SHR(HIGH(LOOP$FACTOR(SNUMB)), 1);   /*ROUND-
                       OFF */
430  4              SBIN1 = SBIN1 PLUS 0;
431  4              SBIN2 = SBIN2 PLUS 0;

432  4              SBIN2 = SHR(SBIN2, 1);
433  4              SBIN1 = SCR(SBIN1, 1);
434  4              SBIN0 = SCR(SBIN0, 1);
435  4           END;   /* END OF IF N <10, ELSE */

436  3        IF INTEGRATS < 88H THEN
437  3        DO;
                /* TEST FOR PHASOR BALANCE */
438  4           IF (X + (Z:= SHR(SIGMAS0,1))) > Y THEN
439  4              DO;
440  5                 IF SPHASED(1) > SPHASED(2) THEN
441  5                    DO;
442  6                       X = SPHASED(2);
443  6                       Y = SPHASED(1);
444  6                    END;
                        ELSE
445  5                    DO;
446  6                       X = SPHASED(1);
447  6                       Y = SPHASED(2);
448  6                    END;

449  5              IF (X + Z) > Y THEN REJECT(SNUMB) = TRUE;    /* ALL PHASORS
                       BALANCED */
451  5              END;
452  4           SPHASED(0),SPHASED(1),SPHASED(2),SPHASED(3),SSNX(J) = 0;
453  4           INTEGRATS = MAXINT;
454  4           CYCLE$ERR$S(SNUMB) = TRUE;
455  4        END;
```

```
                /* RETURN VARIABLES TO SLAVE ARRAYS */
456   3         SC(K) = SC3;
457   3         SL(K) = SL3;
458   3         SC(K:= K-1) = SC2;
459   3         SL(K) = SL2;
460   3         SC(K:= K-1) = SC1;
461   3         SL(K) = SL1;
462   3             SC(K:= K-1) = SC0;
463   3             SL(K) = SL0;

464   3             SBIN(J) = SBIN0;
465   3             SBIN(J:= J+1) = SBIN1;
466   3             SBIN(J:= J+1) = SBIN2;

467   3             SPHSEA(SNUMB) = SPHASEA;
468   3             SPHSEB(SNUMB) = SPHASEB;
469   3             SPHSEC(SNUMB) = SPHASEC;
470   3             SPHSED(SNUMB).DECISION(0) = SPHASED(0);
471   3             SPHSED(SNUMB).DECISION(1) = SPHASED(1);
472   3             SPHSED(SNUMB).DECISION(2) = SPHASED(2);
473   3             SPHSED(SNUMB).DECISION(3) = SPHASED(3);

474   3             SLVCNTX(SNUMB) = SLVCNT;
475   3             SLVCNTY(SNUMB) = INTEGRATS;

476   3         END;   /*END IF PLSCNT < 20H, THEN */

ELSE
477   2         DO;    /* IF PLSCNT >= 20H */

/*OUTPUT PHASE CODE*/
478   3         IF (PHASOUT:=PRETIME(PREPTR) AND 0F0H) < 30H THEN
479   3           DO;
480   4           IF PHASOUT = 10H THEN OUTPUT(OUT4) = MPHASA;
482   4           ELSE OUTPUT(OUT4) = MPHASB;
483   4           END;   /*END OF IF PHASOUT < 30H, THEN*/
                ELSE
484   3           DO;
485   4           IF (PHASOUT AND 10H) = 10H THEN OUTPUT(OUT4) = SPHASB;
487   4           ELSE OUTPUT(OUT4) = SPHASA;
488   4           END;   /*END OF IF PHASOUT < 30H, ELSE*/

489   3         OUTPUT(OUT3) = 8;
490   3         MUX0 = INPUT(IN1) AND 3FH;

491   3         DO WHILE MUX0 > 1FH;       /* WAIT */
492   4           MUX0 = INPUT(IN1) AND 3FH;
493   4         END;   /* END OF DO WHILE */

/*LOAD PHASE CODE*/
494   3         DISABLE;
495   3         OUTPUT(OUT3) = (MUXCON:=MUXCON OR 0B0H);   /*DISABLE FINE LOOP*/
496   3         OUTPUT(OUT3) = (MUXCON:=MUXCON AND 8FH);

/*LOAD PRETIME*/
497   3         OUTPUT(OUT4) = PRETIME(PREPTR-2);
498   3         OUTPUT(OUT3) = MUXCON OR 10H;
499   3         OUTPUT(OUT3) = MUXCON;

500   3         OUTPUT(OUT4) = PRETIME(PREPTR-1);
501   3         OUTPUT(OUT3) = MUXCON OR 20H;
502   3         OUTPUT(OUT3) = MUXCON;
```

```
503  3      OUTPUT(OUT4) = PRETIME(PREPTR);
504  3      OUTPUT(OUT3) = MUXCON OR 40H;
505  3      OUTPUT(OUT3) = (MUXCON:= MUXCON AND 0FH);   /* ENABLE
             FINE LOOP */
506  3      ENABLE;

507  3      END;   /* END OF IF PLSCNT < 20H, ELSE */

508  2      END SLAVE$FINE;

509  1      END SLAVEFINE$MODULE;
```

MODULE INFORMATION:

```
   CODE AREA SIZE     = 0F60H    3936D
   VARIABLE AREA SIZE = 0000H    0D
   MAXIMUM STACK SIZE = 0002H    2D
   692 LINES READ
   0 PROGRAM ERROR(S)
```

END OF PL/M-80 COMPILATION

INTERFERENCE$CHECK

ISIS-II PL/M-80 V3.0 COMPILATION OF MODULE INTERFERENCECHECKMODULE
OBJECT MODULE PLACED IN :F1:INTCHK. OBJ
COMPILER INVOKED BY: plm80 :F1:INTCHK.SRC

```
            $DATE(10 APR 78)
            $DEBUG
            $PAGEWIDTH(96)
            $TITLE('INTERFERENCE$CHECK')

/*  DECLAR.JD [12780,22506]    J. DELANO      04/10/78 */

1           INTERFERENCE$CHECK$MODULE:
            DO; /* BEGINNING INTERFERENCE CHECK PROGRAM MODULE */

/* LORAN C PROGRAM DECLARATIONS */

2    1      DECLARE LIT LITERALLY 'LITERALLY',
                    DCL LITERALLY 'DECLARE';

3    1      DCL EXT LIT 'EXTERNAL',
                    PUB LIT 'PUBLIC';

/* DISPLA DECLARATIONS */
4    1      DCL (DIGIT,DSDIG,DISP1,DISP2) BYTE EXT;
5    1      DCL (SEGN1,SEGN2,NBCD1,NBCD2,SIGLIT) (6) BYTE EXT;
6    1      DCL IN1 LIT '0E4H',
                OUT1 LIT '0E8H',
                OUT2 LIT '0E9H',
                OUT3 LIT '0EAH',
                OUT4 LIT '0E5H',
                OUT5 LIT '0E6H';
```

```
                    /* B$BCD AND BCD$B DECLARATIONS */
7    1      DCL (BIN0,BIN1,BIN2,BCD0,BCD1,BCD2,BCD3,BCD4,BCD5) BYTE EXT;
8    1      DCL (BCDPTR,BINPTR) ADDRESS EXT;

/* NO GLOBAL DECLARATIONS USED SEG7 */

/* READ DECLARATIONS */
9    1      DCL TRUE LIT '0FFH';
10   1      DCL FOREVER LIT 'WHILE TRUE';
11   1      DCL MUXCON BYTE EXT;
12   1      DCL (MUX0,MUX1,MUX2,MUX3,MUX4,MUX5,MUX6,MUX7) BYTE EXT;

/* MASTER$COARSE DECLARATIONS */
13   1      DCL (MFOUND,MCOUNT,MASPTR,PHSPTR,PHASER,CORRELATE) BYTE EXT;
14   1      DCL MTIME(24) BYTE EXT;
15   1      DCL MPHASE(8) BYTE EXT;
16   1      DCL (MBIN0,MBIN1,MBIN2) BYTE EXT;
17   1      DCL (TEMP0,TEMP1,TEMP2) BYTE EXT;
18   1      DCL (MREF0,MREF1,MREF2,MPRED0,MPRED1,MPRED2) BYTE EXT;
19   1      DCL ELAPTIM BYTE EXT;
20   1      DCL MPHASA LIT '1100$1010B';
21   1      DCL MPHASB LIT '1001$1111B';
22   1      DCL SPHASA LIT '1111$1001B';
23   1      DCL SPHASB LIT '1010$1100B';

/* MASTER$FINE DECLARATIONS */
24   1      DCL (MPHASEA,MPHASEB,MPHASEC,MASCNT) ADDRESS EXT;
25   1      DCL MPHASED (4) ADDRESS EXT;
26   1      DCL (PLSCNT,SWCNT,SKYWAVE,RIGHT,LEFT) BYTE EXT;
27   1      DCL (SUB0,SUB1,SUB2,TEMPA0,TEMPA1,TEMPA2) BYTE EXT;
28   1      DCL (GRI0,GRI1,GRI2,MSUM0,MSUM1,MSUM2,MSUM3,DIVISOR,EXP) BYTE EXT;
29   1      DCL (COHERENCY,UPRLIM,FASTSETL,INTEGRATION) ADDRESS EXT;
30   1      DCL (MAXINT,INTEGRATM,SIGMAM0,SIGMAM1) ADDRESS EXT;
31   1      DCL (PRETIME0,PRETIME1,PRETIME2) BYTE EXT;
32   1      DCL (CORRECT0,CORRECT1,CORRECT2) BYTE EXT;
33   1      DCL (CYCLE$ERR$M,MSN0,MSN1,MSN2) BYTE EXT;

/* SLAVE$COARSE DECLARATIONS */
34   1      DCL (SFOUND,SORTBIN,SORT) (5) BYTE EXT;
35   1      DCL MASK (5) BYTE EXT;
36   1      DCL CFBIN (128) BYTE EXT;
37   1      DCL FFBIN (96) BYTE EXT;
38   1      DCL (BINTME0,BINTME1,BINTME2) BYTE EXT;
39   1      DCL (PTR,MPTR,BINCNT,PTRMAX) BYTE EXT;
40   1      DCL (CNT,CNT3,CNT4,NEXT) BYTE EXT;

/* SLAVE$FINE DECLARATIONS */
41   1      DCL (SBIN0,SBIN1,SBIN2,SC0,SC1,SC2,SC3,SL0,SL1,SL2,SL3) BYTE EXT;
42   1      DCL (SNUMB,PHASOUT,PHI0,PHI1) BYTE EXT;
43   1      DCL (SLVCNT,INTEGRATS,SPHASEA,SPHASEB,SPHASEC) ADDRESS EXT;
44   1      DCL (SIGMAS0,SIGMAS1) ADDRESS EXT;
45   1      DCL SPHASED (4) ADDRESS EXT;
46   1      DCL (SIGMASA,SIGMASB,LOOP$FACTOR) (5) ADDRESS EXT;
47   1      DCL (SBIN,SSNX) (15) BYTE EXT;
48   1      DCL (SC,SL) (20) BYTE EXT;
49   1      DCL (REJECT,CYCLE$ERR$S,SCOUNT,SKYWAVES,RIGHTS,LEFTS,N,POWER)
               (5) BYTE EXT;
50   1      DCL (SLVCNTX,SLVCNTY,SPHASEA,SPHSEB,SPHSEC) (5) ADDRESS EXT;
51   1      DCL SPHSED (5) STRUCTURE (DECISION (4) ADDRESS) EXT;
52   1      DCL (SPRED0,SPRED1,SPRED2) BYTE EXT;
53   1      DCL (SSN0,SSN1,SSN2) BYTE EXT;
```

```
                /* TIMEOUT DECLARATIONS */
54   1      DCL (X,Y,Z) ADDRESS EXT;
55   1      DCL (MINUSIGN,HISTOLIM) BYTE EXT;

/* MAIN DECLARATIONS */
56   1      DCL PRETIME(18) BYTE EXT;
57   1      DCL PREPTR BYTE EXT;
58   1      DCL (I,J,K) BYTE EXT;
59   1      DCL MBCD (6) BYTE EXT;
60   1      DCL DUMMY ADDRESS EXT;
61   1      DCL TABLE (6) BYTE EXT;
62   1      INTERFERENCE$CHECK: PROCEDURE PUB;

63   2      SNUMB = 5;
64   2      MUX6 = 0FH;    /* MUX6 = 3*SNUMB */
65   2      DO WHILE SNUMB > 2;
66   3      SNUMB = SNUMB - 1;
67   3      MUX6 = MUX6 - 3;

68   3      TEMP2,TEMPA0,TEMPA1,TEMPA2 = 0FFH;

69   3      IF SFOUND(SNUMB) = TRUE THEN
70   3        DO;
71   4           SBIN0 = SBIN(MUX6);
72   4           SBIN1 = SBIN(MUX6+1);
73   4           SBIN2 = SBIN(MUX6+2);

74   4           DO I = 0 TO 4;
75   5              IF SORT(I) = SNUMB THEN J = I;
77   5           END;

78   4           IF (J=0) OR (J=4) OR ((NOT(SFOUND(SORT(4)))) AND
                    ((J=3) OR ((NOT(SFOUND(SORT(3)))) AND (J=2)))) THEN
79   4              DO;
80   5                 IF J <> 0 THEN
81   5                    DO;
82   6                       TEMP0 = GRI0 - SBIN0;
83   6                       TEMP1 = GRI1 MINUS SBIN1;
84   6                       TEMP2 = GRI2 MINUS SBIN2;

85   6                       K = SORT(J-1);
86   6                       K = ROL(K, 1) + K;   /*K = 3*SORT(J-1) */
87   6                       TEMPA0 = SBIN(K);
88   6                       TEMPA1 = SBIN(K+1);
89   6                       TEMPA2 = SBIN(K+2);

90   6                       TEMPA0 = SBIN0 - TEMPA0;
91   6                       TEMPA1 = SBIN1 MINUS TEMPA1;
92   6                       TEMPA2 = SBIN2 MINUS TEMPA2;
93   6                    END;

ELSE
94   5                    DO;
95   6                       TEMP0 = SBIN0;
96   6                       TEMP1 = SBIN1;
97   6                       TEMP2 = SBIN2;

98   6                       IF SFOUND(K:=SORT(1)) = TRUE THEN
99   0                          DO;
100  7                             K = ROL(K, 1) + K;   /*K = 3*SORT(1) */
101  7                             TEMPA0 = SBIN(K);
102  7                             TEMPA1 = SBIN(K+1);
103  7                             TEMPA2 = SBIN(K+2);
```

```
104    7                         TEMPA0 = TEMPA0 - SBIN0;
105    7                         TEMPA1 = TEMPA1 MINUS SBIN1;
106    7                         TEMPA2 = TEMPA2 MINUS SBIN2;
107    7                       END;
108    6                     END;
109    5                  END;   /* END OF IF (J=0) OR (J=4) OR ((J=2) AND ...),
                               THEN */
                       ELSE
110    4               DO;
111    5                  IF SFOUND(K:=SORT(J+1))= TRUE THEN
112    5                    DO;
113    6                      K = ROL(K, 1) + K;    /*K = 3*SORT(J+1) */
114    6                      TEMP0 = SBIN(K);
115    6                      TEMP1 = SBIN(K+1);
116    6                      TEMP2 = SBIN(K+2);
117    6                      TEMP0 = TEMP0 - SBIN0;
118    6                      TEMP1 = TEMP1 MINUS SBIN1;
119    6                      TEMP2 = TEMP2 MINUS SBIN2;
120    6                    END;

121    5                  K = SORT(J-1);
122    5                  K = ROL(K, 1) + K;    /* K = 3*SORT(J-1) */
123    5                  TEMPA0 = SBIN(K);
124    5                  TEMPA1 = SBIN(K+1);
125    5                  TEMPA2 = SBIN(K+2);

126    5                  TEMPA0 = SBIN0 - TEMPA0;
127    5                  TEMPA1 = SBIN1 MINUS TEMPA1;
128    5                  TEMPA2 = SBIN2 MINUS TEMPA2;
129    5               END;

/* MULTIPLY TEMP AND TEMPA BY 8 */
130    4          DO I = 0 TO 2;
131    5             TEMP0 = TEMP0 + TEMP0;
132    5             TEMP1 = TEMP1 PLUS TEMP1;
133    5             TEMP2 = TEMP2 PLUS TEMP2;
134    5          END;

135    4          DO I = 0 TO 2;
136    5             TEMPA0 = TEMPA0 + TEMPA0;
137    5             TEMPA1 = TEMPA1 PLUS TEMPA1;
138    5             TEMPA2 = TEMPA2 PLUS TEMPA2;
139    5          END;

/* IF TEMP OR TEMPA <10 649.6US, THEN REJECT SLAVE #SNUMB */
140    4          IF (TEMP2 < 0DH) OR (TEMPA2 < 0DH) THEN REJECT(SNUMB) = TRUE;

142    4       END;   /* END OF IF SFOUND(SNUMB) = TRUE, THEN */
143    3     END;   /* END OF DO WHILE SNUMB */

144    2   END INTERFERENCE$CHECK;

145    1   END INTERFERENCE$CHECK$MODULE;
```

MODULE INFORMATION:

```
    CODE AREA SIZE    = 02D7H    727D
    VARIABLE AREA SIZE = 0000H     0D
    MAXIMUM STACK SIZE = 0000H     8D
    221 LINES READ
    0 PROGRAM ERROR(S)
```

END OF PL/M-80 COMPILATION

SORT

```
ISIS-II PL/M-80 V3.0 COMPILATION OF MODULE SORTMODULE
OBJECT MODULE PLACED IN :F1:SQROOT.OBJ
COMPILER INVOKED BY:   PLM80  :F1:SQROOT.SRC $DATE(07 JAN 78)
            $DEBUG
            $PAGEWIDTH(96)
            $TITLE(.'SORT')

1           SORT$MODULE:
            DO;

/* SQROOT.WW[12350,26376]     W. WURST      01/07/78 */

2    1      SORT: PROCEDURE (X) ADDRESS PUBLIC;

3    2      DECLARE X ADDRESS;
4    2      DECLARE I BYTE;
5    2      DECLARE ROOT (10) BYTE DATA
            (15D,
             17D,
             23D,
             32D,
             45D,
             64D,
             90D,
             112D,
             160D,
             181D);

6    2      I = 0;
7    2      DO WHILE X > 80H;     /* 128D */
8    3         X = SHR(X,  1);
9    3         I = I + 1;
10   3      END;

11   2      IF I > 9 THEN I = 9;
13   2      RETURN ROOT(I);

14   2      END SORT;

15   1      END SORT$MODULE;

MODULE INFORMATION:

CODE AREA SIZE     = 004DH      77D
    VARIABLE AREA SIZE = 0003H       3D
    MAXIMUM STACK SIZE = 0002H       2D
    38 LINES READ
    0 PROGRAM ERROR(S)

END OF PL/M-80 COMPILATION
             READ

ISIS-II PL/M-80 V.3.0 COMPILIATION OF MODULE READMODULE
OBJECT MODULE PLACED IN :F1:READ.OBJ
COMPILER INVOKED BY:   PLM80  :F1:READ.SRC
```

```
        $DATE(05 AUG 77)
        $DEBUG
        $ P AGEWIDTH(96)
        $T:[TLE('READ')

1       READ$MODULE:
        DO:

2   1   DE CLARE LIT LITERALLY 'LITERALLY',
               DCL LITERALLY 'DECLARE';

3   1   DCL EXT LIT 'EXTERNAL',
            PUB LIT 'PUBLIC';

/* DISPLA DECLARATIONS */
4   1   DCL (DIGIT,DSDIG,DISP1,DISP2) BYTE EXT;
5   1   DCL (SEGN1,SEGN2,NBCD1,NBCD2) (6) BYTE EXT;
6   1   DCL IN1 LIT '0E4H',
            OUT1 LIT '0E8H',
            OUT2 LIT '0E9H',
            OUT3 LIT '0EAH',
            OUT4 LIT '0ESH',
            OUTS LIT '0E6H',
7   1   DCL (MUXCON,MUX0) BYTE EXT;

/*  READ.WW[12350,8194]    W. WURST     6/30/77    */

8   1   READ: PROCEDURE PUB;
9   2       OUTPUT(OUT3)=(MUXCON:=MUXCON AND 88H);
10  2       MUX0 = INPUT(IN1) AND 3FH;

11  2       DO WHILE MUX0 = 0;
12  3           MUX0 = INPUT(IN1) AND 3FH;
13  3       END;  /* END OF DO WHILE  */
14  2   END READ;

15  1   END READ$MODULE;

MODULE INFORMATION:

CODE AREA SIZE      = 0024H     36D
    VARIABLE AREA SIZE  = 0000H      0D
    MAXIMUM STACK SIZE  = 0000H      0D
    48 LINES READ
    0 PROGRAM ERROR(S)

SEG7

ISIS-II PL/M-80 V3.0 COMPILATION OF MODULE SEG7MODULE
OBJECT MODULE FL ACED IN :F1:SEG7.OBJ
COMPILER INVOKED BY:   PLM80 :F1:SEG7.SRC $DATE(12 SEP 77)
        $DEBUG
        $PAGEWIDTH(96)
        $TITLE('SEG7')

1       SEG7$MODULE:
        DO;
```

```
2   1    DECLARE LIT LITERALLY 'LITERALLY',
                 DCL LITERALLY 'DECLARE';

3   1    DCL EXT LIT 'EXTERNAL',
                 PUB LIT 'PUBLIC',

/* DISPLA DECLARATIONS */
4   1    DCL (DIGIT,DSDIG,DISP1,DISP2) BYTE EXT;
5   1    DCL (SEGN1,SEGN2,NBCD1,NBCD2) (6) BYTE EXT;
6   1    DCL IN1 LIT '0E4H',
             OUT1 LIT '0E8H',
             OUT2 LIT '0E9H',
             OUT3 LIT '0EAH',
             OUT4 LIT '0E5H',
             OUT5 LIT '0E6H';

/*  SEG7.WW[12350,8194]      W. WURST      9/12/77 */

7   1    SEG7:PROCEDURE (BCD) BYTE PUB;
8   2       DECLARE (I, BCD) BYTE;
9   2       DECLARE SEGMENT (17) BYTE DATA
            (0$011$1111B,
             0$000$0110B,
             0$101$1011B,
             0$100$1111B,
             0$110$0110B,
             0$1L1L0$1101B,
             0$111$1101B,
             0$000$0111B,
             0$111$1111B,
             0$110$1111B,
             0$111$0111B,
             0$111$1100B,
             0$()11$1001B,
             0$101$1110B,
             0$111$1001B,
             0$111$0001B,
             0$000$0000B);
               SEG7

10  2       I=BCD;
11  2          IF BCD>0FH THEN I=10H;
13  2          RETURN SEGMENT (I);
14  2    END SEG7;

15  1    EN1) SEG7$MODULE;

MODULE INFORMATION:

CODE   AREA SIZE    = 0032H    50D
     VARIABLE AREA SIZE  = 0002H     2D
     MAXIMUM STACK SIZE  = 0000H     0D
     62 LINES READ
     0 PROGRAM ERROR(S)

END OF PL/M-80 COMPILATION
```

DISPLAY

```
ISIS-II PL/M80 V3.0 COMPILATION OF MODULE DISPLAYMODULE
OBJECT MODULE PLACED IN :F1:DSPLA.OBJ
COMPILER INVOKED BY:   PLM80 :F1:DSPLA. SRC $DATE(23 AUG 77)
            $DEBUG
            $PAGEWIDTH(96)
            $TITLE('DISPLAY')
            $INTVECTOR(4,0)

1           DISPLAY$MODULE:
            DO;

2    1      DECLARE LIT LITERALLY 'LITERALLY',
                    DCL LITERALLY 'DECLARE';

3    1      DCL EXT LIT 'EXTERNAL',
                PUB LIT 'PUBLIC';

/* DISPLA DECLARATIONS */
4    1      DCL IN1 LIT '0E4H',
                OUT1 LIT '0E8H',
                OUT2 LIT '0E9H',
                OUT3 LIT '0EAH',
                OUT4 LIT '0E5H',
                OUT5 LIT '0E6H';
5    1      DCL (DIGIT,DSDIG) BYTE EXT;
6    1       DCL (SEGN1,SEGN2,SIGLIT) (6) BYTE EXT;

/* DSPLA,WW[12350,8194]      W.WURST          8/23/77 */

7    1      DSIPLA: PROCEDURE INTERRUPT  15;
8    2         OUTPUT(OUT5) = SIGLIT(DIGIT);   /* TURN OFF ALL
                  DIGITS */
9    2         IF DIGIT = 0 THEN
10   2            DO;
11   3            DIGIT = 6;
12   3            DSDIG = 10111111B;
13   3            END;
14   2         DIGNIT = DIGIT - 1;
15   2            OUTPUT(OUT1) = SEGN1(DIGIT);
16   2            OUTPUT(OUT2) = SEGN2(DIGIT);
17   2            OUTPUT(OUT5) = (DSDIG:=ROR(DSDIG,1)) AND
                     SIGLIT(DIGIT);
18   2         RETURN;
19   2      END DSPLA;

20   1      END DISPLAY$MODULE;

MODULE INFORMATION:

CODE AREA SIZE    = 0048H    75D
    VARIABLE AREA SIZE = 0000H    0D
    MAXIMUM STACK SIZE = 0008H    8D
    48 LINE S RE AD
    0 PROGRAM ERROR(S)

END OF PL/M-80 COMPILIATION
```

What we claim is:

1. Apparatus for removing the effects of noise generated internal to a navigation receiver-indicator that provides navigation information comprising
    means for periodically generating a first signal,
    first means responsive to said first signal for periodically inverting the phase of said received navigation signals in the front end of said receiver to cause noise generated in said front end of said receiver to average out and thereby be effectively removed, and
    second means responsive to said first signal for reinverting the phase of said navigation signals to remove the phase inversion introduced by said first means, said phase reinversion of said navigation signals being accomplished at a point within said receiver whereat internally generated noise is not a significant problem and before phase reinversion introduces problems deriving said navigation information.

2. The apparatus in accordance with claim 1 wherein said first signal generating means comprises counter means incremented for each of said period navigation signals and divider means responsive to the count in said counter means to periodically generate said first signal.

3. The apparatus in accordance with claim 2 wherein said first means comprises an amplifier that normally passes navigation signals input thereto through without phase inversion but in response to said first signal inverts the phase of said navigation signals passing therethrough.

4. The apparatus in accordance with claim 3 wherein said second means comprises an exclusive OR logic gate to a first input of which is applied said navigation signals and to a second input of which is applied said first signal, said logic gate inverting the phase of said navigation signals applied thereto upon said first signal being applied to said second inputs.

5. Apparatus for removing the effects of noise generated internal to and in the front end of a LORAN navigation receiver-indicator that provides navigation information by receiving signals periodically transmitted by each of a plurality of navigation transmitters and measuring the difference in time of arrival of said signals from pairs of said navigation transmitters comprising
    means for generating a first signal having a period which is a whole number multiple of the period of the signal transmitted by each of said navigation transmitters, said first signal having two states and being in each state an equal amount of time,
    a first inverter located in the front end of said receiver which inverter is responsive to said first signal to periodically invert the phase of said received navigation signals passing therethrough to cause said noise internally generated in the front end of said to be averaged out and thereby be effectively removed, and
    a second inverter responsive to said first signal for reinverting the phase of said received navigation signals at a point within said receiver whereat internally generated noise is not a significant problem and before said phase inversion introduces problems in deriving said navigation information.

6. A method for removing the effects of noise internally generated in the front end of a navigation receiver on received navigation signals comprising the steps of
    periodically inverting the phase of received navigation signals in the front end of said receiver so that the effect of said internally generated noise on said received navigation signals is averaged out and thereby effectively removed, and
    periodically reinverting the phase of received navigation signals further in the signal path through said receiver whereat noise internally generated is not a problem to remove all phase inversions of said navigation signals made within said receiver.

7. A method for removing the effects of noise internally generated in the front end of a navigation receiver-indicator that provides navigation information by receiving and measuring the difference in the time of arrival of navigation signals transmitted by a plurality of navigation transmitters comprising the steps of
    periodically inverting the phase of received navigation signals in the front end of said receiver so that the effect of said internally generated noise on said received navigation signals is averaged out and thereby effectively removed, and
    periodically reinverting the phase of received navigation signals further in the signal path through said receiver whereat noise internally generated is not a problem to remove all phase inversions of said navigation signals made within said receiver.

* * * * *

UNITED STATES PATENT OFFICE
CERTIFICATE OF CORRECTION

PATENT NO. : 4,325,067
DATED : April 13, 1982
INVENTOR(S) : Lester R. Brodeur

It is certified that error appears in the above-identified patent and that said Letters Patent are hereby corrected as shown below:

In the drawings, Sheet 2, FIG. 8, above the logic gates and below the shift registers, delete the reference numerals "1" and "1A" "3" and "3A" and "9" and "9A" and replace them, respectively, with --9-- and --9A--, --8-- and --8A--, and --1-- and --1A--. In the right-hand shift register block "2000" should read --1000--. Output lines "2" and "2A" and the inverter (shown in triangle) connected between lines "2" and "2A" should be deleted. Thus, FIG. 8 should be represented as appears on the following sheet:

Signed and Sealed this

Eleventh Day of March 1986

[SEAL]

Attest:

DONALD J. QUIGG

Attesting Officer

Commissioner of Patents and Trademarks

UNITED STATES PATENT OFFICE
CERTIFICATE OF CORRECTION

PATENT NO. : 4,325,067  
DATED : April 13, 1982  
INVENTOR(S) : Lester, R. Brodeur Page 2 of 2

It is certified that error appears in the above-identified patent and that said Letters Patent are hereby corrected as shown below:

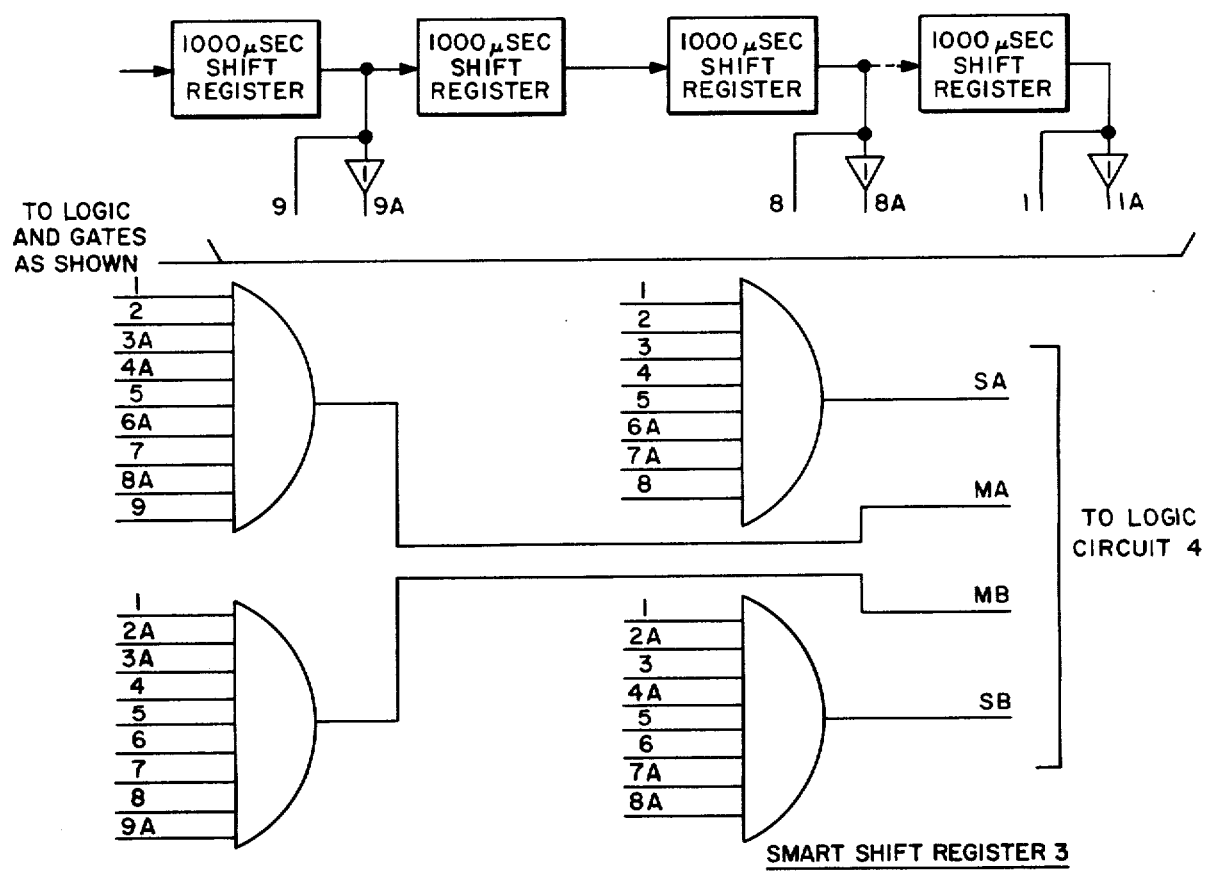

FIG. 8.